US012270232B2

(12) United States Patent
Fink et al.

(10) Patent No.: US 12,270,232 B2
(45) Date of Patent: Apr. 8, 2025

(54) TAMPER RESISTANT GRAVITY LATCH

(71) Applicant: FATH, Inc., Orlando, FL (US)

(72) Inventors: Armin Fink, Ocoee, FL (US); William Kenneth Williams, Lexington, NC (US); Joseph Oliva, Orlando, FL (US)

( * ) Notice: Subject to any disclaimer, the term of this patent is extended or adjusted under 35 U.S.C. 154(b) by 309 days.

(21) Appl. No.: 17/872,100

(22) Filed: Jul. 25, 2022

(65) Prior Publication Data

US 2024/0026711 A1 Jan. 25, 2024

(51) Int. Cl.

| | |
|---|---|
| ***E05B 65/52*** | (2006.01) |
| ***B65F 1/16*** | (2006.01) |
| ***E05B 15/00*** | (2006.01) |

(52) U.S. Cl.

CPC ........ *E05B 65/5292* (2013.01); *B65F 1/1615* (2013.01); *E05B 15/0093* (2013.01); *E05B 65/5253* (2013.01); *B65F 2210/148* (2013.01)

(58) Field of Classification Search

CPC ............. E05B 65/5292; E05B 15/0093; B65F 1/1615; B65F 2210/148

USPC .......................................... 292/130, 131, 183

See application file for complete search history.

(56) References Cited

U.S. PATENT DOCUMENTS

| | | | |
|---|---|---|---|
| 26,518 | A | 12/1859 | Page |
| 2,918,318 | A | 12/1959 | Sacharski |
| 3,206,238 | A | 4/1963 | Speight et al. |
| 4,165,112 | A | 8/1979 | Kleefeldt |
| 4,714,286 | A | 12/1987 | Yamamoto |
| D293,548 | S | 1/1988 | Bates |
| 4,865,368 | A | 9/1989 | McCall et al. |
| 5,094,358 | A | 3/1992 | Serio, Sr. |
| 5,106,131 | A | 4/1992 | Willcox |
| 5,106,132 | A | 4/1992 | Bako et al. |
| D333,715 | S | 3/1993 | Mahler |

(Continued)

FOREIGN PATENT DOCUMENTS

| | | | |
|---|---|---|---|
| DE | 2946095 | A1 | 5/1981 |
| DE | 102007039351 | A1 | 11/2008 |
| EP | 0831195 | A1 | 3/1998 |

OTHER PUBLICATIONS

Eberhard, Jan. 18, 2024; https://www.zoro.com/ eberhard-manufacturing-co-rod-latch-emc-561-64/i/G402009578/ (2024).

*Primary Examiner* — Gilbert Y Lee
*Assistant Examiner* — Peter H Watson
(74) *Attorney, Agent, or Firm* — Wolter Van Dyke Davis, PLLC; Robert L. Wolter

(57) ABSTRACT

An apparatus (2100), including: a hasp (2104) configured to retain a staple therein when in an engaged position (2106); an actuator (2110) that is biased toward a locking position (2112) configured to lock the hasp in the engaged position, where once the hasp is moved into the engaged position the actuator can reach the locking position; an actuator weight (2130) configured to move under the influence of gravity once the apparatus is tilted from an upright orientation by more than an actuator weight threshold amount and to disengage the actuator from the hasp upon reaching an unlocking position (2136) with sufficient force; and a time delay lock assembly (2150) configured to be initiated when the apparatus is tilted from the upright orientation by a time delay lock threshold amount of tilt and configured to prevent movement of the actuator weight only after an initiation and a time delay.

17 Claims, 22 Drawing Sheets

(56) References Cited

U.S. PATENT DOCUMENTS

| | | | | |
|---|---|---|---|---|
| 5,224,744 | A * | 7/1993 | Michelutti | B65F 1/1615 292/234 |
| 5,316,353 | A | 5/1994 | McKernan | |
| 5,347,262 | A | 9/1994 | Thurmond | |
| D364,329 | S | 11/1995 | Ziemer | |
| 5,518,282 | A | 5/1996 | Sawada | |
| 5,551,737 | A | 9/1996 | Clavin | |
| 5,673,810 | A | 10/1997 | Rockroth | |
| 5,735,428 | A | 4/1998 | Chern | |
| 5,738,395 | A | 4/1998 | Probst | |
| 5,772,264 | A | 6/1998 | Bettenhausen | |
| D439,497 | S | 3/2001 | Clark | |
| 6,257,030 | B1 | 7/2001 | Davis et al. | |
| 6,382,688 | B1 | 5/2002 | Agostini | |
| 6,666,485 | B1 | 12/2003 | Moret | |
| 6,685,240 | B2 | 2/2004 | Bacon | |
| 6,695,362 | B2 | 2/2004 | Kluting | |
| 6,880,717 | B1 | 4/2005 | O'Conor | |
| 7,228,719 | B2 | 6/2007 | Alchin et al. | |
| 7,311,350 | B2 | 12/2007 | Mitsui | |
| D587,558 | S | 3/2009 | Sarnowski | |
| 7,540,393 | B2 | 6/2009 | Wong | |
| D605,493 | S | 12/2009 | Tejszerski | |
| 8,191,953 | B2 | 6/2012 | Simon et al. | |
| 8,313,126 | B2 | 11/2012 | Ferkovich | |
| 8,333,530 | B2 | 12/2012 | Omori | |
| 8,366,156 | B2 | 2/2013 | Mercier et al. | |
| 8,479,949 | B2 | 7/2013 | Henkel | |
| 8,511,723 | B2 | 8/2013 | Otsuka | |
| 8,550,282 | B1 | 10/2013 | Libhart et al. | |
| 8,590,348 | B1 | 11/2013 | Skjellerup | |
| 8,960,735 | B2 | 2/2015 | Michael et al. | |
| 9,188,143 | B1 | 11/2015 | Motherwell | |
| 9,376,255 | B2 | 6/2016 | Banik et al. | |
| D807,137 | S | 1/2018 | Whitaker | |
| 10,066,426 | B2 | 9/2018 | Hunt | |
| 10,100,554 | B2 | 10/2018 | Michael et al. | |
| D839,074 | S | 1/2019 | Fink | |
| 10,472,863 | B2 | 11/2019 | Mazal | |
| 10,781,897 | B2 | 9/2020 | Sayama | |
| 10,961,752 | B2 | 3/2021 | Borlodan | |
| 2003/0155366 | A1 | 8/2003 | Raghunathan | |
| 2007/0175898 | A1 | 8/2007 | Craft et al. | |
| 2008/0289372 | A1 | 11/2008 | Rendon | |
| 2009/0102204 | A1 | 4/2009 | Hilliard | |
| 2009/0255724 | A1 | 10/2009 | Anders | |
| 2010/0156119 | A1 | 6/2010 | Mueller | |
| 2011/0031765 | A1 | 2/2011 | Vazquez et al. | |
| 2012/0292927 | A1 | 11/2012 | Vazquez | |
| 2013/0306637 | A1 | 11/2013 | Pallwitz | |
| 2014/0034645 | A1 | 2/2014 | Jackson | |
| 2014/0260451 | A1 | 9/2014 | Quach | |
| 2015/0035288 | A1 | 2/2015 | Fink et al. | |
| 2016/0060898 | A1 | 3/2016 | Michael | |
| 2016/0265255 | A1 | 9/2016 | Mazal | |
| 2017/0320666 | A1 | 11/2017 | Reeb | |
| 2019/0277069 | A1 | 9/2019 | Lim | |

* cited by examiner

TAMPER RESISTANT GRAVITY LATCH

FIELD OF THE INVENTION

The present invention relates to latches for containers, and more particularly, to a latch for locking a lid to a body of a container subject to being tampering by wildlife.

BACKGROUND OF THE INVENTION

It is known for latches that lock containers to lock the container when the container is in an upright orientation and unlock the container when the container is in a tilted position while being emptied during collection. However, in the event that the container falls or is knocked over onto one of its sides for reasons other than collection, such latches may prematurely unlock the container. Consequently, there remains room in the art for improvement.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

Figure 1:
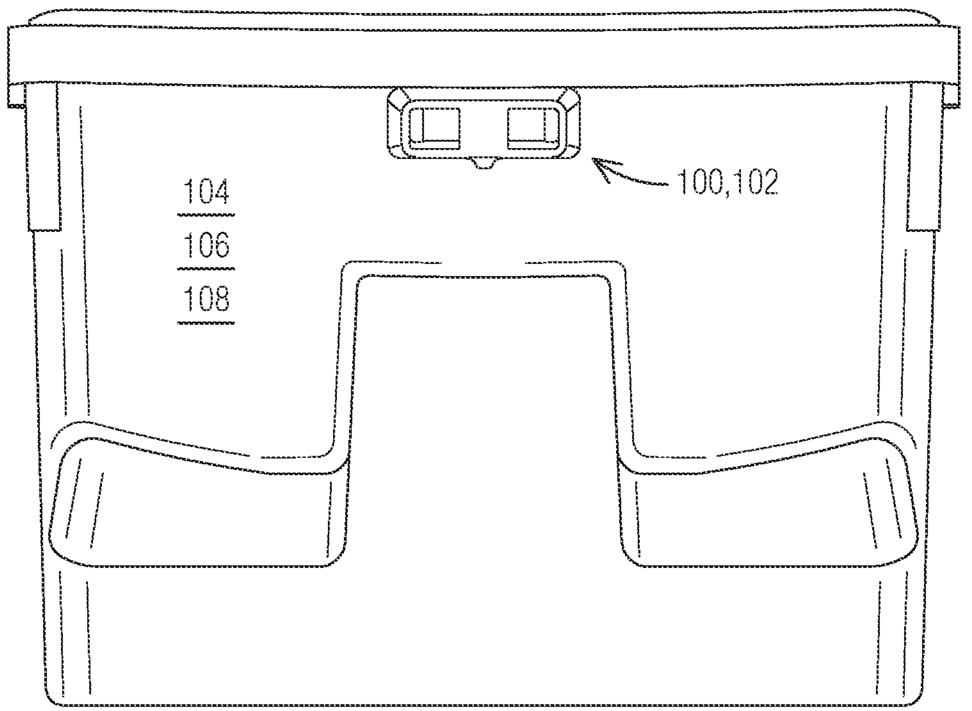
FIG. 1 shows a manual release mechanism of the latch assembly mounted to an exterior surface of a front of a container.

FIG. 1 shows a manual release mechanism 100 of a latch assembly 102 mounted to an exterior surface 104 of a front 106 of a container 108. In an embodiment the container 108 includes a lid (not shown) that is hinged at a back of the container 108, and the container 108 is designed to be tilted forward to be emptied. Containers of this sort are often used to house common household waste. During a collection operation, a vehicle with a specialized apparatus grabs the container 108, lifts it and then tilts it forward to empty the contents of the container into a receptacle on the vehicle. Accordingly, for this type of container the lid must automatically open when tilted forward from upright but need not automatically open when in other orientations. The manual release mechanism 100 enables a manual release of the lid regardless of an orientation of the container 108 and a state of the manual release mechanism 100.

Figure 2:
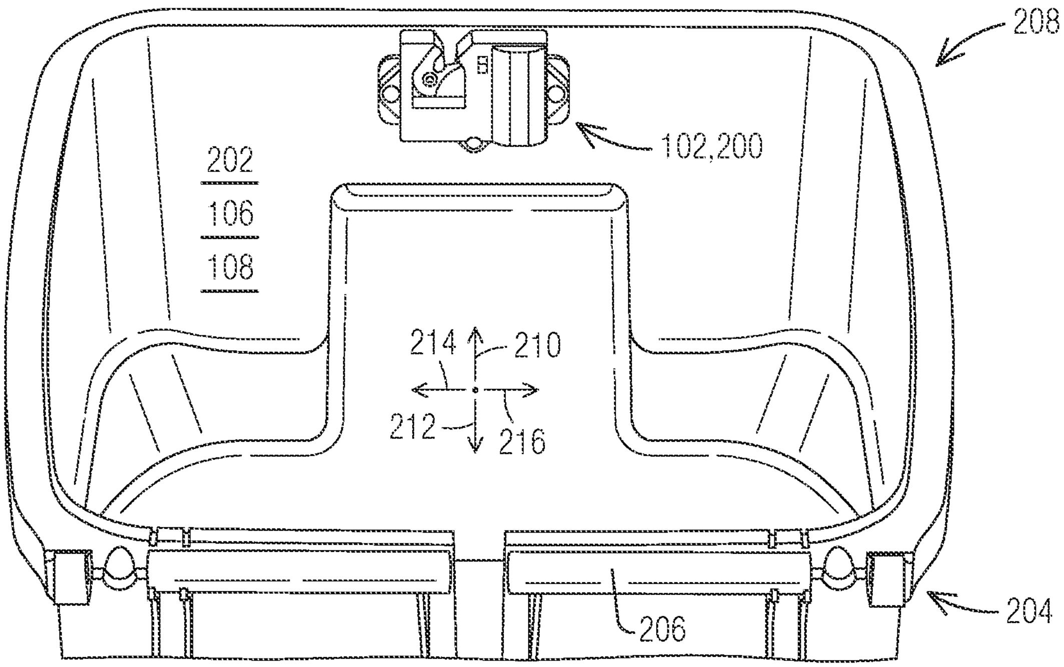
FIG. 2 shows a hasp assembly of the latch assembly mounted to an interior surface of the front of the container.

FIG. 2 shows a hasp assembly 200 of the latch assembly 102 mounted to an interior surface 202 of the front 106 of the container 108. It is equally possible to mount the hasp assembly 200 and manual release mechanism 100 at other locations in the container 108, including other locations in the front 106 as well as the sides. At a rear 204 of the container 108 is a hinge 206 for the lid (not shown). The latch assembly for securing a container 108 includes the manual release mechanism 100, the latch assembly 200, and a staple.

In FIG. 1 and FIG. 2 the container 108 is shown in an upright orientation 208 from which the container 108 may rotate in a forward direction 210, a backward direction 212, a sideways left direction 214, and a sideways right direction 216. The rotational directions are shown with arrows and refers to a direction of movement experienced by the hasp assembly 200 when the container 108 is rotated from the upright orientation 208. As such, the hasp assembly 200 moves in the directions shown as the hasp assembly 200 rotates with the container 108.

A staple (not shown) is secured to the lid, and the hasp assembly 200 is configured to engage the staple, thereby holding the lid closed.

The hasp assembly 200 will only release the staple (and the lid) if the manual release mechanism 100 is manually activated or if the container 108 is rotated from the upright orientation 208 in the forward direction 210 and under limited circumstances. The limited circumstances are intended to include circumstances that reflect a collection of the refuse and to exclude most other circumstances. This enables the release of the lid for collection and no release of the lid when wildlife knocks the container 108 over in pursuit of its contents. Once locked, the hasp assembly 200 must be "reset" by returning the container 108 (and attached hasp assembly 200) to the upright orientation 208 before the hasp assembly 200 will release the staple.

Figure 3:
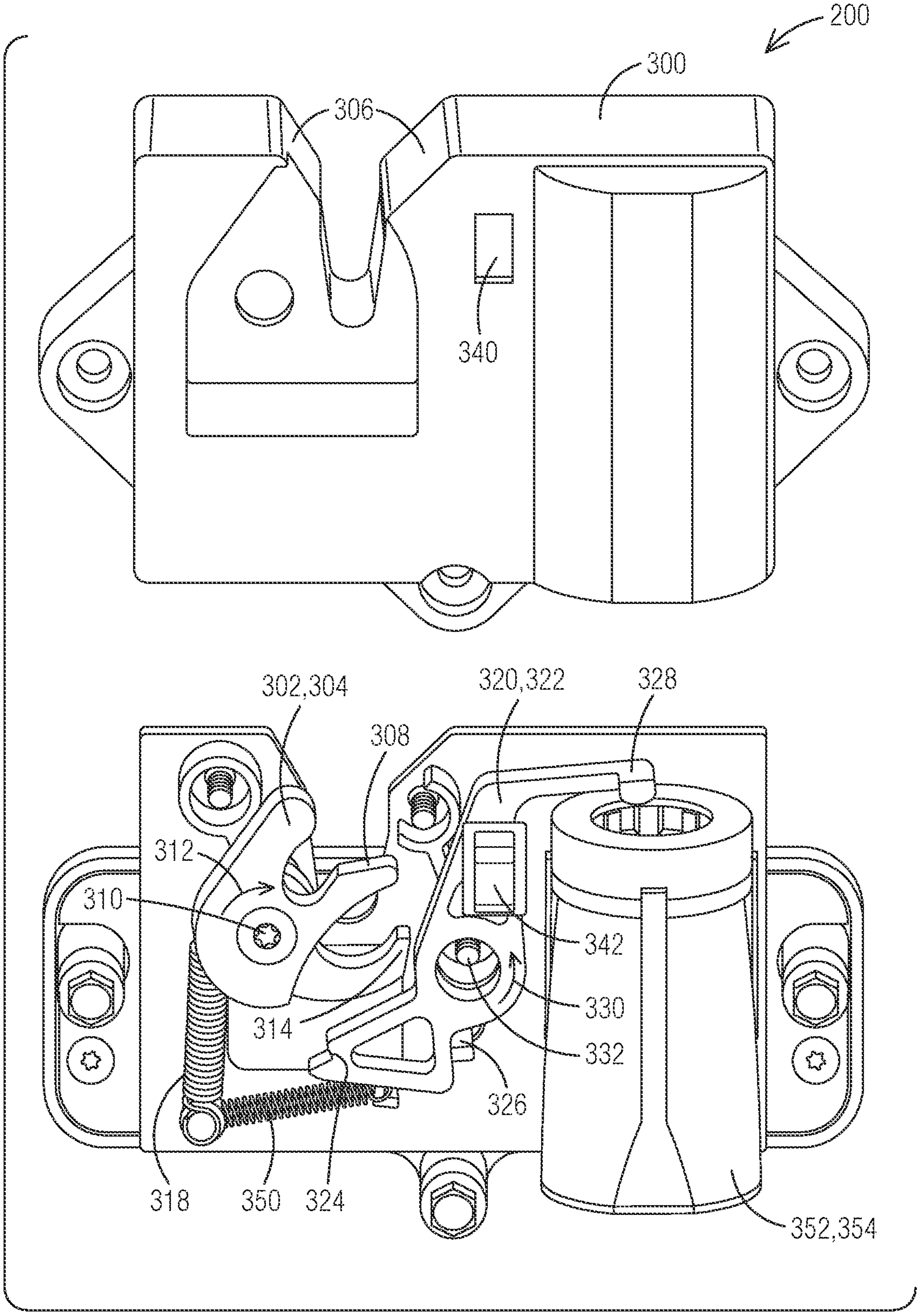
FIG. 3 shows the hasp assembly of FIG. 2 with a cover removed and a hasp in a disengaged position.

FIG. 3 shows the hasp assembly 200 of FIG. 2 with a cover 300 removed and a hasp 302 that is biased into a disengaged hasp position 304. Optional ramps 306 guide the staple into the hasp 302 as the lid is closed. Once the staple abuts a contact area 308 of the hasp 302, continued lowering of the lid (and staple) causes the hasp 302 to rotate about a hasp stud 310 in a clockwise direction 312. The hasp 302 includes a hasp tab 314. The hasp 302 is biased into the disengaged hasp position 304 by, for example, a hasp spring 318.

An actuator 320 is shown in an actuated position 322 which disengages an actuator catch 324 from the hasp tab 314. This, in turn, permits the hasp 302 to move to the disengaged hasp position 304 as is shown. Movement of the actuator 320 into the actuated position 322 is against a bias of and actuator spring 350. The actuator 320 includes an actuator catch 324, an internal release tab 326 (not visible), and a release element 328. As the hasp 302 rotates in the clockwise direction 312 the hasp tab 314 contacts the actuator catch 324, and continued rotation of the hasp 302 causes the actuator 320 to rotate in a counterclockwise direction 330 about an actuator stud 332. Upon sufficient rotation of the hasp 302 and the actuator 320, the hasp tap 314 and the actuator catch 324 interlock each into respective engaged positions. The cover 300 include an internal side opening 340 through which the internal release tab 326 projects into a flexible cap 342 when the cover 300 is assembled. Also visible is an actuator housing 352 of an actuator mechanism 354.

Figure 4:
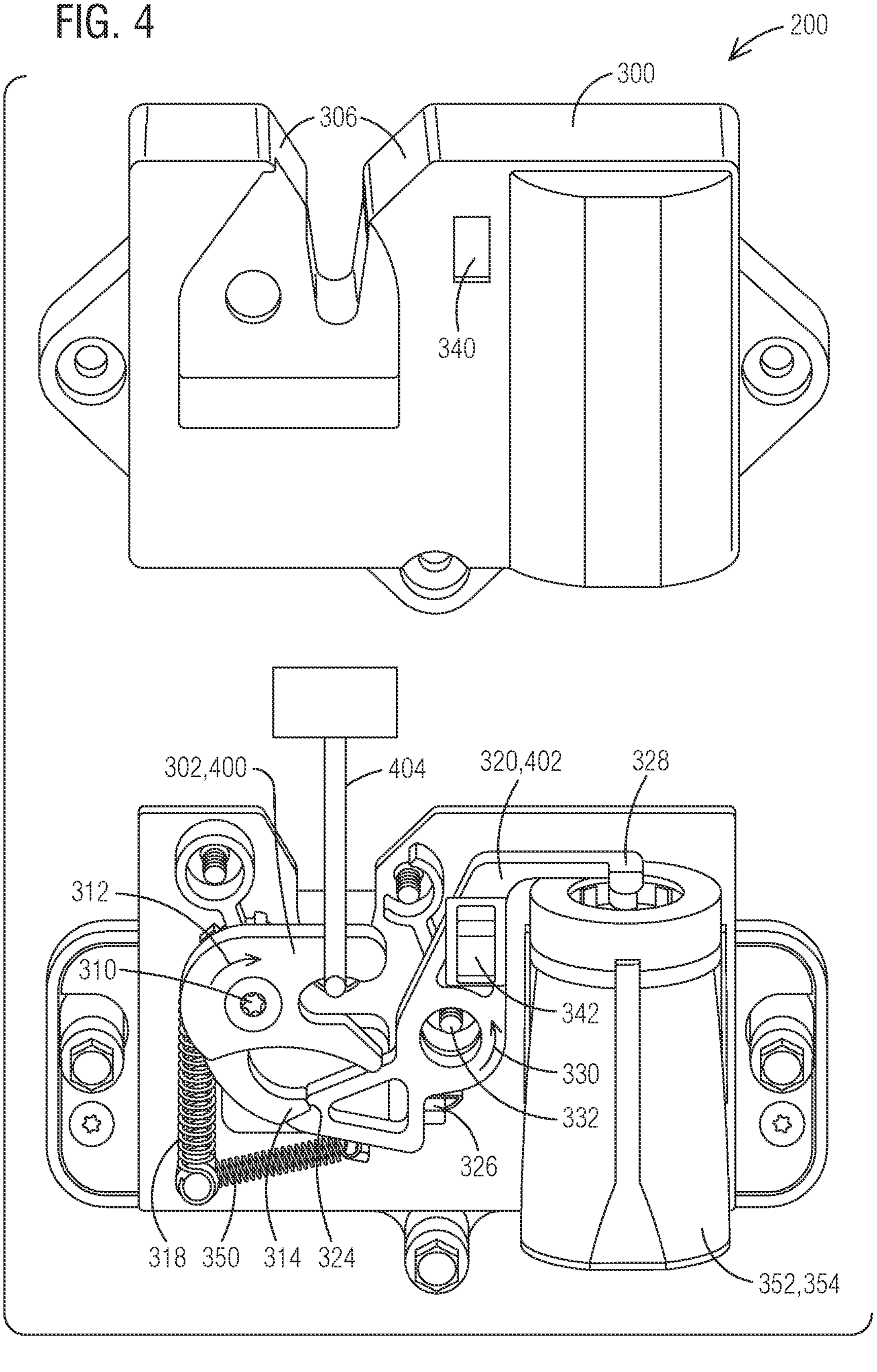
FIG. 4 shows the hasp assembly of FIG. 3 with the hasp in an engaged position and engaging a staple.

FIG. 4 shows the hasp assembly 200 of FIG. 3 after the hasp 302 has rotated in the clockwise direction 312 enough for the hasp tab 314 to engage the actuator catch 324. The engagement occurs due to the clockwise bias on the actuator 320 caused by the actuator spring 350 and the counterclockwise bias of the hasp tab 314 caused by the hasp spring 318 working against each other. When the hasp 302 is in this engaged hasp position 400, and the actuator 320 is in this engaged actuator position 402, the hasp 302 secures the staple 404 so that the staple 404 cannot be removed unless the manual release mechanism 100 is manually activated or the container 108 is rotated in the forward direction 210 from the upright orientation 208 under the proper conditions.

Although this embodiment includes the hasp 302 and the actuator 320 and their associated features and springs, those of ordinary skill in the art will understand that other arrangements may be used to releasably engage the staple. For example, coil springs may be used instead of linear springs, recesses and catches may be reversed, and the hasp may operate in the opposite direction etc.

Figure 5:
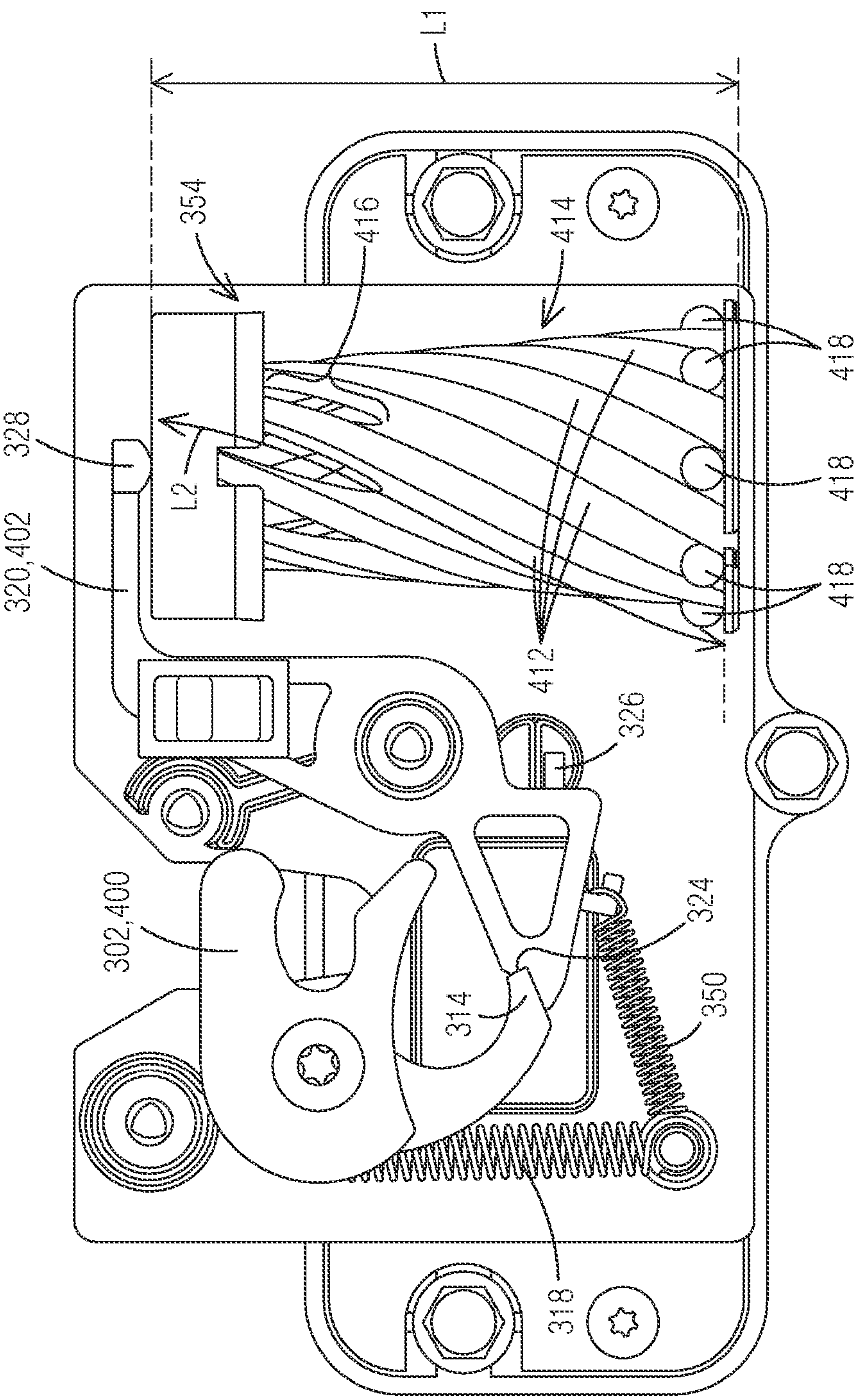
FIG. 5. is a front view of the hasp assembly of FIG. 2 showing details of an actuator mechanism.
Figure 6:
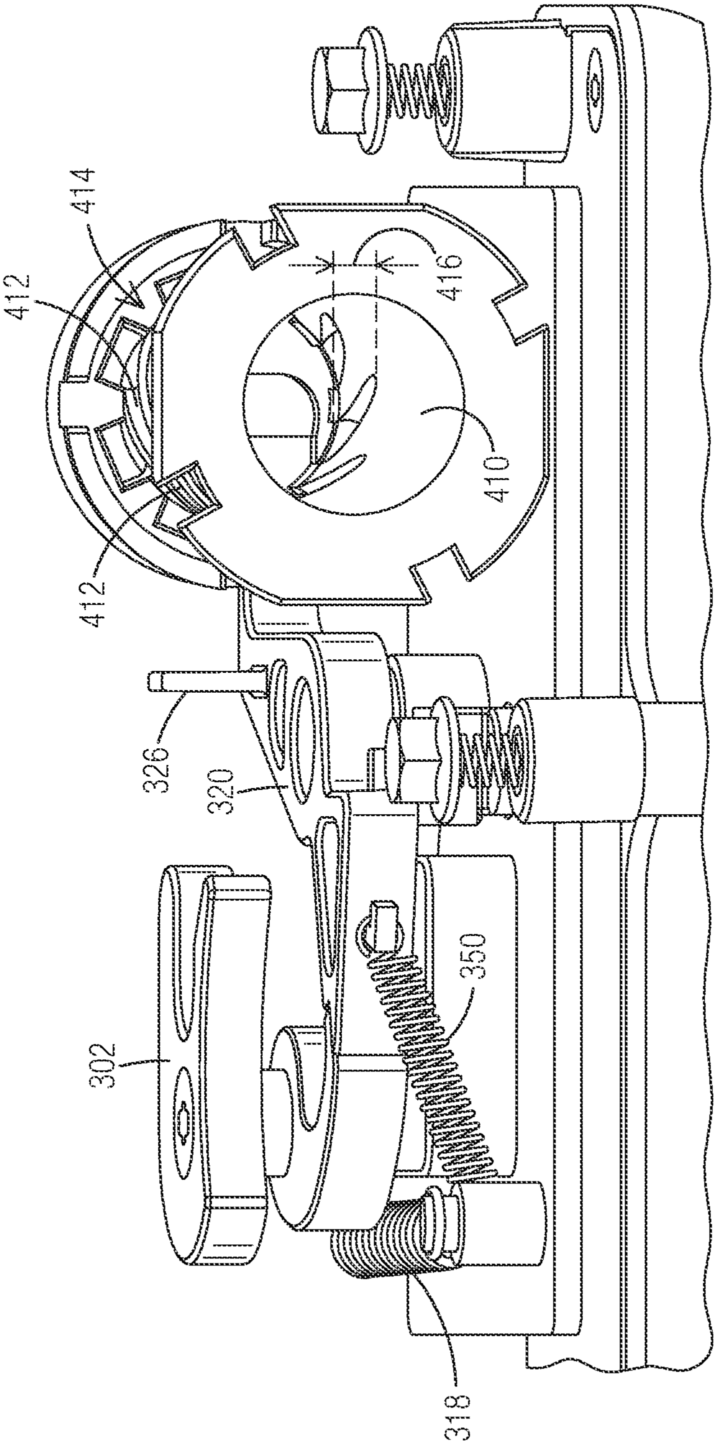
FIG. 6 is a bottom perspective view of the actuator mechanism of FIG. 5.

In FIGS. 5-6, the actuator housing 352 has been removed to show a first passage 410 and a plurality of second passages 412 arranged around the first passage 410. In the embodiment shown, the first passage 410 is straight. The plurality of second passages 412 form an annular array 414 of second tapered-helix-shaped passages 412 disposed about the first passage 410. The annular array 414 may be tapered/converging so that each second passage 412 of the annular array 414 progressively converges into the first passage 410 in a respective blending region 416. A first element (not visible) is disposed in the first passage 410 and is free to travel therein. A second element 418 is disposed in each second passage 412 and free to travel therein. As seen in FIG. 5, a linear/travel length L1 of the first passage 410 is shorter than a linear/travel length L2 of the second passage 412.

Figure 7:
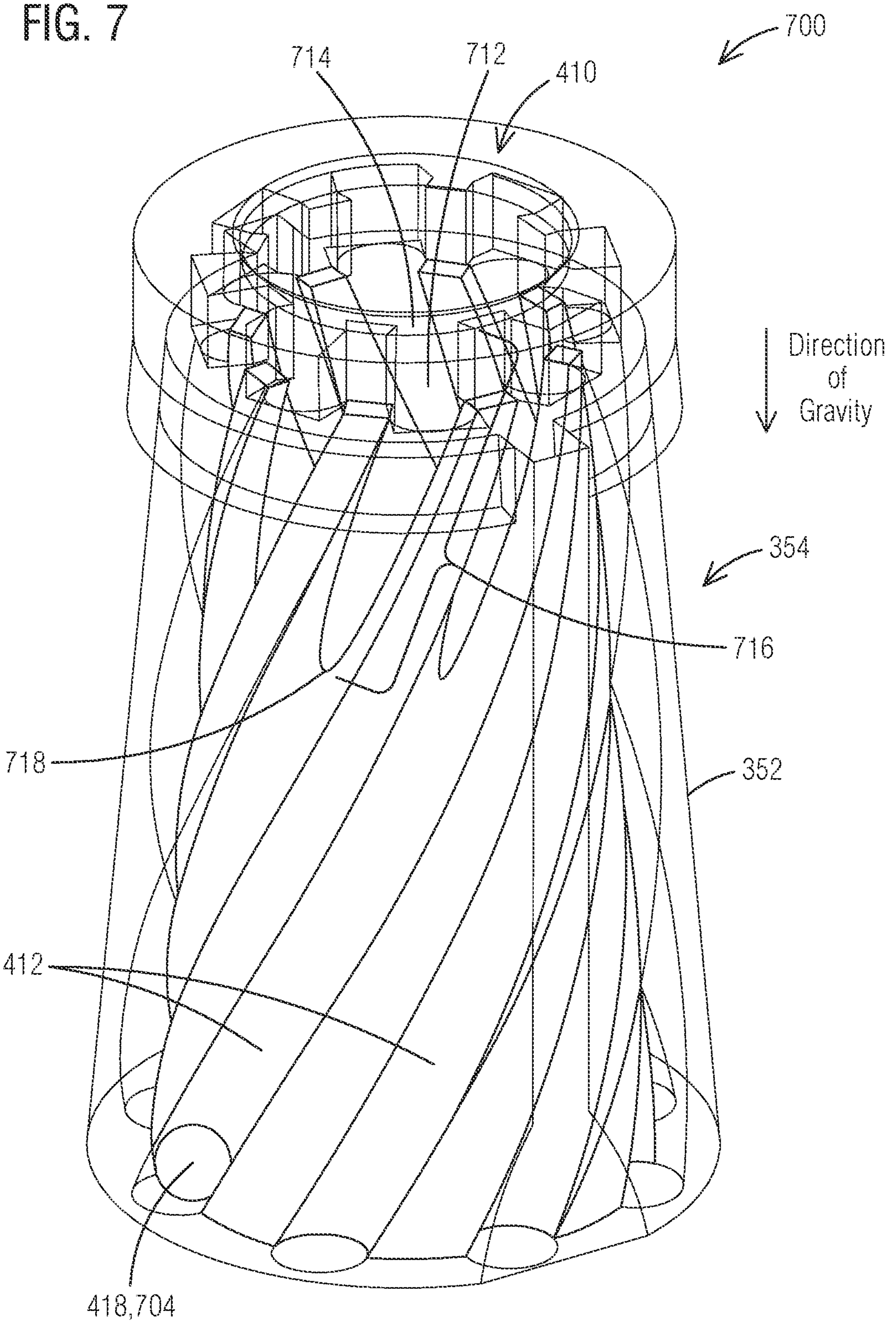
FIG. 7 shows the actuator mechanism in an upright orientation with a second element in a home position.

FIG. 7 shows the actuator mechanism 354 in an upright orientation 700. For sake of clarity, only one second element 418 is shown, but what is described for the shown second element 418 may apply to some or all second elements. In the upright orientation 700, the first element (not visible) is urged by gravity to remain in a first element home position at a bottom of the first passage 410. In the upright orientation 700, the second element 418 is similarly urged by gravity to remain in in a second element home position 704. In the upright orientation 700, also visible in FIGS. 5-6, the actuator 320 is untouched by the actuator mechanism 354 and the lid is locked unless released using the manual release mechanism 100.

Each second passage 412 includes a terminal position 712 in which the second element 418 is stopped by a stop 714. In the terminal position, the second element 418 protrudes into the first passage 410 enough to block the first element from passing the second element 418. Each second passage 412 is helical in shape and converges into the first passage 410 in a direction from the second element home position 704 to the terminal position 712. This creates a blending region 716 of the second passage 412 that starts at an upstream end 718 and extends toward the terminal position 712. In the blending region 716 the second passage 412 progressively increasingly converges into the first passage 410 toward the terminal position 712.

Figure 8:
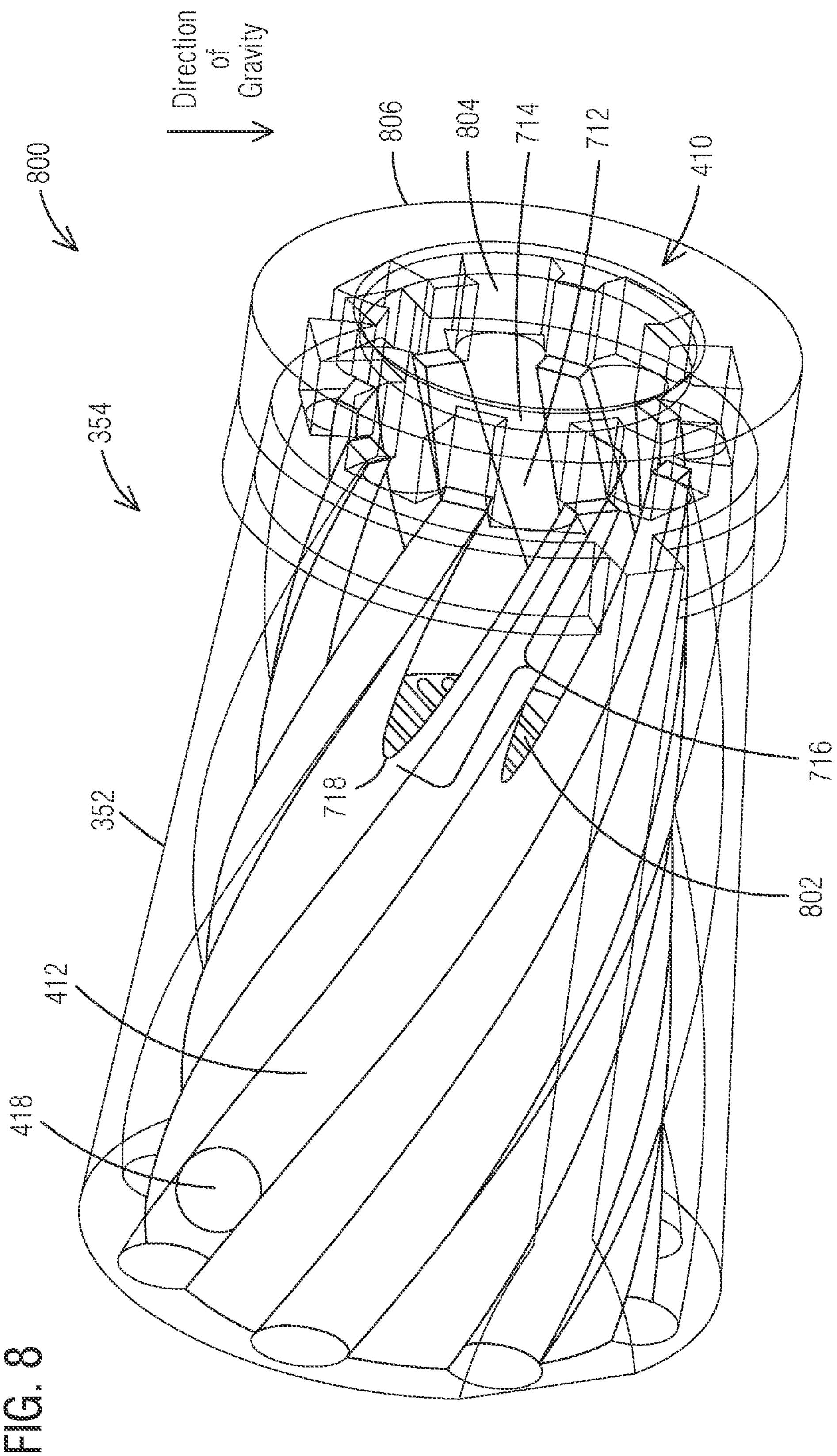
FIG. 8 shows the actuator mechanism in a tilted orientation with the second element having left the home position.

FIG. 8 shows the actuator mechanism 354 in a tilted orientation 800. The first element 802 has left the first element home position and is traveling toward an opening 804 at a distal end 806 of the actuator mechanism 354. The second element 418 has left the second element home position 704 and is traveling toward the terminal position 712.

This movement is caused by an externally applied force. The externally applied force may be at least one of gravity and force imparted by the act of collecting the contents from the container 108. For example, the actuator mechanism 354 in FIG. 8 is tilted such that at least one second element 418 will travel down its second passage 412 under the influence of gravity alone. If this angle is reached as a result of a collection operation, then energy imparted by the collection operation will contribute to the motion of the elements. It is possible that a resulting tilt angle is such that elements are urged to stay in their home positions by gravity, but this is overcome by forces of the collection operation that urge the elements out of their home positions. For example, for tilt angles of just under ninety degrees, the collection operation could still impart enough force to move the elements and release the lid.

Figure 9:
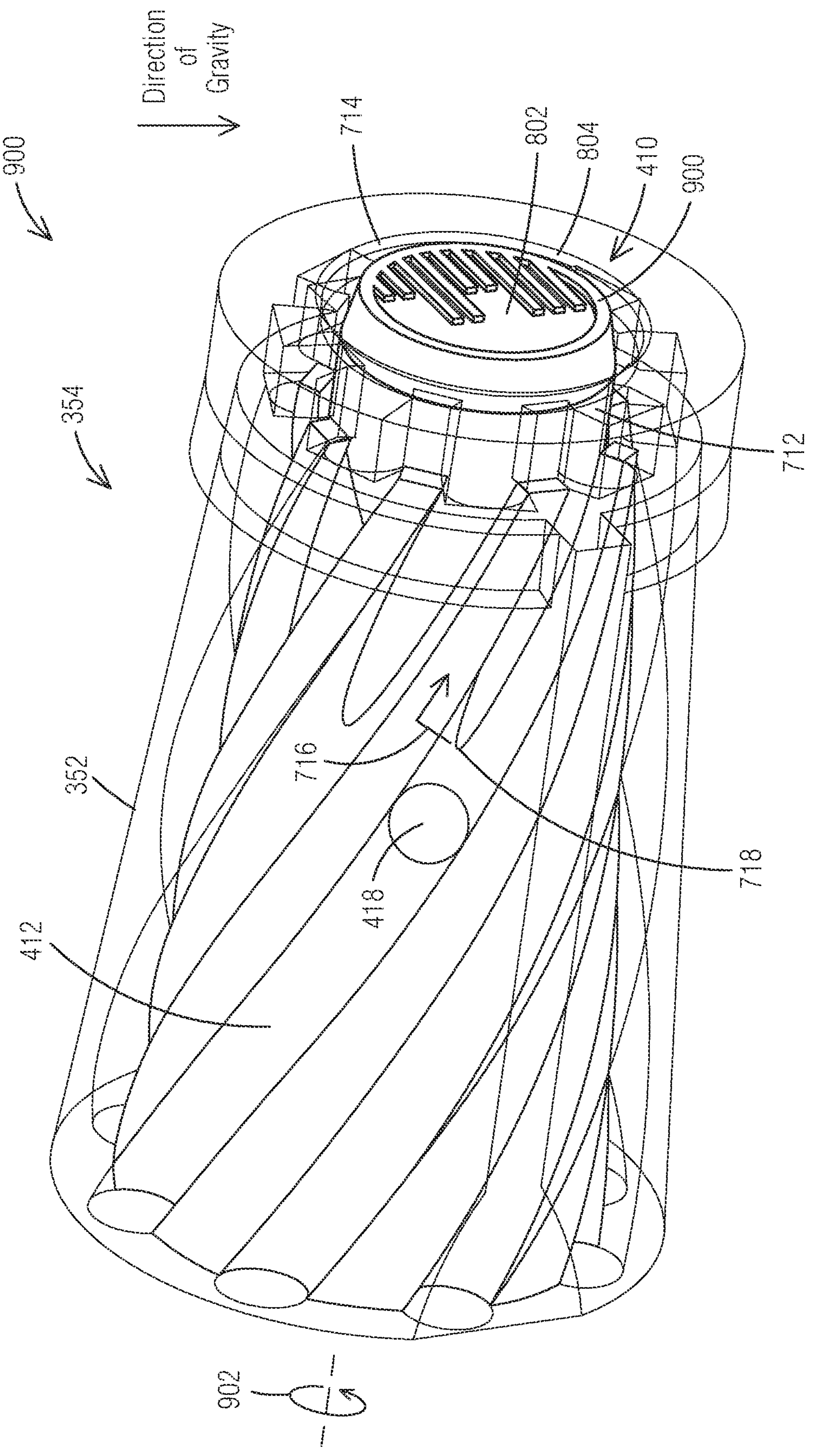
FIG. 9 shows the actuator mechanism in the tilted orientation with the first element not blocked by the second element.

FIG. 9 shows the actuator mechanism 354 in the tilted orientation 800 with the first element 802 having reached the opening 804. This unblocked arrangement is possible because the second element 418 has not reached a point in the blending region 716 where it is protruding into the first passage 410. If the first passage 410 is not sufficiently occluded by the second element 418, the first element 802 is free to travel past the second element 418, past the terminal position 712, and past the opening 804. If the first element 802 exits the first passage 410 like this, it may impact the release element 328 of the actuator 320. If the first element 802 impacts the release element 328 of the actuator 320 with enough momentum to overcome the bias of the actuator spring 350, the actuator 320 will release the hasp tab 314 of the hasp 302. Then, the bias of the hasp spring 318 and/or weight of the lid will turn the hasp 302 counterclockwise (as seen in FIG. 3), thereby releasing the staple 404. This occurs under tilting conditions associated with refuse collection.

Figure 10:
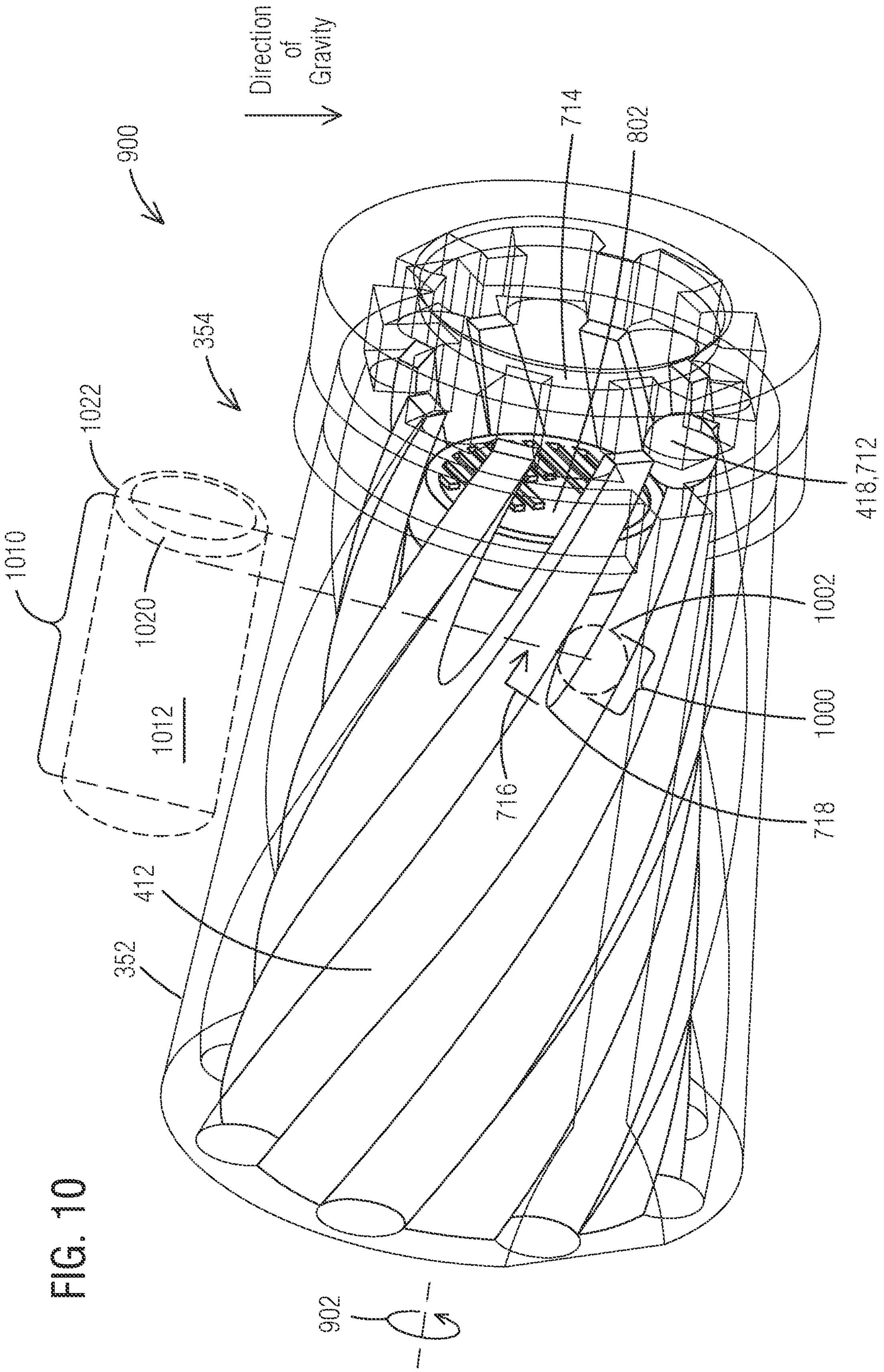
FIG. 10 shows the actuator mechanism in the tilted orientation with the first element being blocked by the second element.

FIG. 10 shows the actuator mechanism 354 in the tilted orientation 800 with the first element 802 being blocked by the second element 418. This blocked arrangement is possible because the second element 418 reached the terminal position 712 and blocked the first element 802 from passing the second element 418. Hence, when the second element 418 blocks the first element 802, the first element 802 cannot reach the release element 328 of the actuator 320. When the first element 802 cannot reach the release element 328, the actuator 320 will not actuate and the hasp 302 will not release. This occurs under tilting conditions not associated with refuse collection, such as wildlife efforts to open the container 108.

FIG. 9 shows one extreme scenario where the first element 802 reaches the opening 804 before the second element 418 even reaches the blending region 716. FIG. 10 shows an opposite scenario where the second element 418 reaches the terminal position 712 shortly after the first element 802 passes the upstream end 718 of the blending region 716. There may be other scenarios where a leading edge 900 of the first element 802 is more closely travel-aligned with the second element 418 along a longitudinal axis 902 of the first passage 410. As such, whether the second element 418 blocks the first element depends on positions of the first element 802 relative to the second element 418 at a point toward the upstream end 718 of the blending region 716.

A choke is an arrangement of the first passage 410 and the second passage 412 that causes certain convergences of the first element 802 and the second element 418 to interlock with each other such that neither element can proceed along its respective passage. A choked arrangement is any arrangement where the first element 802 and the second element 418 have interlocked in this manner. There may be one choked arrangement or a range of choked arrangements for a given choke and given first and second elements, depending on shapes of the first element 802 and the second element 418 that may contact each other.

For any given choked arrangement, the second element 418 will be at an associated location within the second passage 412. Since there may more than one choked arrangement, the second element 418 may be in a range of associated positions within the second passage 412. A second passage throat 1000 includes the one or more positions of the second element 418 in the second passage 412 when the second element can be part of a choked arrangement. The second passage throat 1000 will be located somewhere in the blending region 716 simply because the second element 418 only protrudes into the first passage 410 in the blending region, and a locked arrangement can only occur when the second element 418 protrudes into the first passage 410. In the embodiment disclosed in FIG. 10, there is only one choked configuration. Accordingly, the second passage throat 1000 includes only one position where the second element 418 is in a choked arrangement in the second passage 412. Therefore, the second passage throat 1000 has a length that is the same as a length of the second element 418. A choked second element 1002 is shown in dashed lines in the second passage throat 1000 as if part of a choked arrangement.

Since there is only one choked arrangement in this example embodiment, a first passage throat 1010 has a length that is the same as a length of the first element 802. A choked first element 1012 is shown in dashed lines and aligned with the first passage throat 1010 as if part of the choked arrangement.

If the first element 802 reaches the first passage throat 1010 at the same time the second element 418 reaches the second passage throat 1000, the first element 802 and the second element 418 may interlock in the choked arrangement and neither will be free to continue down its respective passage. In this scenario, the second element 418 blocks the first element 802 from reaching the release element 328. If the first element 802 passes the first passage throat 1010 before the second element 418 reaches the second passage throat 1000, then the second element 418 cannot proceed until the first element 802 passes. In this scenario, the first element is free to reach the release element 328. If the second element 418 passes the second passage throat 1000 before the first element 802 reaches the first passage throat 1010, the first element 802 must follow the second element 418. In this scenario, the second element 418 stops upon reaching the terminal position 712, thereby blocking the first element 802 from reaching the release element 328.

As noted above, the throats in this embodiment reflects one locked arrangement for sake of discussion. This is because the second element 418 is a sphere and the first element 802 has a chamfer 1020 such that a corner 1022 alone will contact the sphere. Due to these shapes, the range of relative positions that would permit an interlocked arrangement is very narrow. As a result, the likelihood of the first element 802 and the second element 418 actually forming a choked arrangement is very low. The overwhelming majority of times will result in either a blocked arrangement or an unblocked arrangement. Which of the two arrangements occurs depends on at which "side" of the choked configuration the elements arrive. This, in turn, depends on the tilt conditions that motivated the elements to move.

However, even in embodiments like that of FIG. 10, there may be more that the lone theoretical locked arrangement. For example, any one of more of manufacturing tolerances and clearances, flex of the first passage 802, flex of the second passage 418, an orientation of the container 108, and forces and inertia at a moment the first element 802 and the second element 418 converge together may result in more than one locked arrangement and therefore there would be longer associated throats. Nonetheless, the above principles still apply.

The hasp assembly 200 is configured to reach the unblocked configuration and open the lid when the container 108 is tilted under circumstances associated with refuse collection. The hasp assembly 200 is configured to reach the blocked configuration and keep the lid closed when the container 108 is tilted under circumstances not associated with refuse collection, such as wildlife attempting to access the contents of the container by knocking the container over.

Circumstances associated with refuse collection include a tilt in the forward direction 210 with an abrupt stop at the end of the tilt. This abrupt stop causes the first element 802 to move toward the opening 804 at the distal end 806 and ultimately, to impact with the release element 328 of the actuator. Simultaneously, the abrupt stop causes the second elements 418 to begin moving toward the terminal positions 712. The travel length, e.g. a linear length L1 of the first passage 410 is shorter than the travel length, e.g. a linear length L2 of the second passage 412. Since both passages have similar starting and end points along the longitudinal axis 902, it takes the second elements 418 longer to reach the second passage throat 1000 than it takes the first element to pass the first passage throat 1010. This results in an unblocked configuration and an associated release of the lid. The same principles apply in other configurations where there is no blending region 716 and the terminal position 712 is the second passage throat 1000. This could occur where the distal end of a second passage leading to the terminal position 712 is oriented nearly completely radially inward leading to the terminal position 712.

Circumstances not associated with refuse collection include a tilt to a lesser degree than during collection and/or with a less abrupt stop. In such an instance, less energy is imparted to the first element 802. The first element 802 may or may have enough energy to reach the distal end 806 of the first passage 410. In contrast, the second elements 418 will roll freely and thereby move faster than the first element 802 until reaching the terminal position 712. Since the second elements 418 are moving faster than the first element 802, the second elements 418 will pass the second passage throat 1000 before the first element 802 reaches the first passage throat 1010. This results in a blocked configuration and the lid remains locked. The same principles apply in other configurations where there is no blending region 716 and the terminal position 712 is the second passage throat 1000. This could occur where the distal end of a second passage leading to the terminal position 712 is oriented nearly completely radially inward leading to the terminal position 712.

The parameters associated with relative travel speeds include a shape of the first element 802, a shape of the second element 418, a cross-sectional shape of the first passage 410, a cross-sectional shape of the second passage 412, clearance between the element and the respective travel passage, surface finishes and associated frictions, relative lengths of the passages, relative lengths from passage start to a respective throat, an amount of taper of the helical shape, a magnitude of a helix angle of the helical shape from start to the respective throat and/or the terminal position 712, and a pitch of the helix angle. Other parameters may also be considered.

In the example embodiment above, the first element 802 is cylindrical and slides in the first passage 410. This provides increased drag relative to the spherical second elements 418. The first element 8022 includes a chamfer 1020. This provides a corner 1022 to interact with the second element 418. This is chosen because it is difficult to produce circumstances where a corner interacting with a sphere will interlock in a choke. However, other configurations are also considered within the scope of the disclosure. The angle of the chamfer 1020 can be selected to increase or reduce the corner's grip on the wall of the first passage 410. Increased grip can slow the movement of the first element 802 in the first passage 410 during vibration and bounce conditions more associated with wildlife tilting.

Additionally, a ratio of a length to diameter (or width) of the first element 802 may be controlled to control an amount of misalignment that can occur between the first element 802 and the first passage 410 during the vibration/bouncing associated with wildlife tilting. For example, a relatively long first element 802 will remain more aligned within the first passage 410 than will a relatively short first element 802. More misalignment of the relatively shorter first element 802 may cause the corner 1022 to bite more, thereby inhibiting movement of the first element 802 when compared to a relatively longer first element 802 during wildlife tilting.

Similarly, the wall of the first passage 410 may be designed to exhibit a certain amount of resilience that cooperates with the first element 802 to promote or reduce (e.g. to control) the vibration/bounce. Additionally, the wall of the first passage 410 may be designed to exhibit a certain amount of softness to control an amount of bite the corner 1022 of the first element 802 may take when vibrating/bouncing during wildlife tilting.

The first element 802 could also be spherical and its relative speed controlled using other parameters. For example, a spherical first element could be used in conjunction with a longer first passage, or a first passage that is not straight etc.

In the example embodiment above, in the upright orientation 700 the first element 802 and the second element 418 rest on a surface at a common elevation. Hence, the start location of the first passage 410 is the same as a start location of the second passage 412. However, the first passage 410 can start anywhere relative to each other, depending on the conditions warranted.

In the example embodiment above, there are eight evenly circumferentially spaces second passages 412 in the annular array 414. Each second passage 412 rotates through a helix angle from the home position to the terminal position 712. By way of example, a second passage helical angle might be 180 degrees. When there is a helix angle of 180 degrees, when the start of the second passage is at the twelve o-clock position the distal end is at the six o-clock position. If the helix angle extended beyond 180 degrees, the second element would need to travel past the six o-clock position to reach the terminal position. Any travel past the six o-clock position would be uphill. Gravity would fight against a second element from continuing uphill past the 6 six o-clock position, in which case the second element may not reach its terminal position unless it is traveling with significant momentum. Without significant momentum, the second element would stop at the lowest point in the second passage. The chances the home position of a passage landing exactly in the twelve o-clock position are low, so helix angles of less than 180 degrees may be used. From the home position to the terminal position 712, each second passage rotates through a helix angle of approximately ninety (90) degrees to one hundred eighty (180) degrees. In an example embodiment, each second passage 412 rotates through a helix angle of one hundred thirty five (135) degrees, plus or minus fifteen (15) degrees. In an example embodiment, each second passage 412 rotates through a helix angle of about ninety degrees (90°) between the passage start (home position) and the upstream end 718 of the blending region 716.

In this example embodiment, under most tilting scenarios at least three second elements 418 will travel toward the terminal position 712. Others, such as those on a far side in FIG. 10, may not move because their home position at a bottom of an incline. Regardless of how may second passages 412 and second elements 418 are used, it only takes one second element 418 to block the first element 802.

Figure 11:
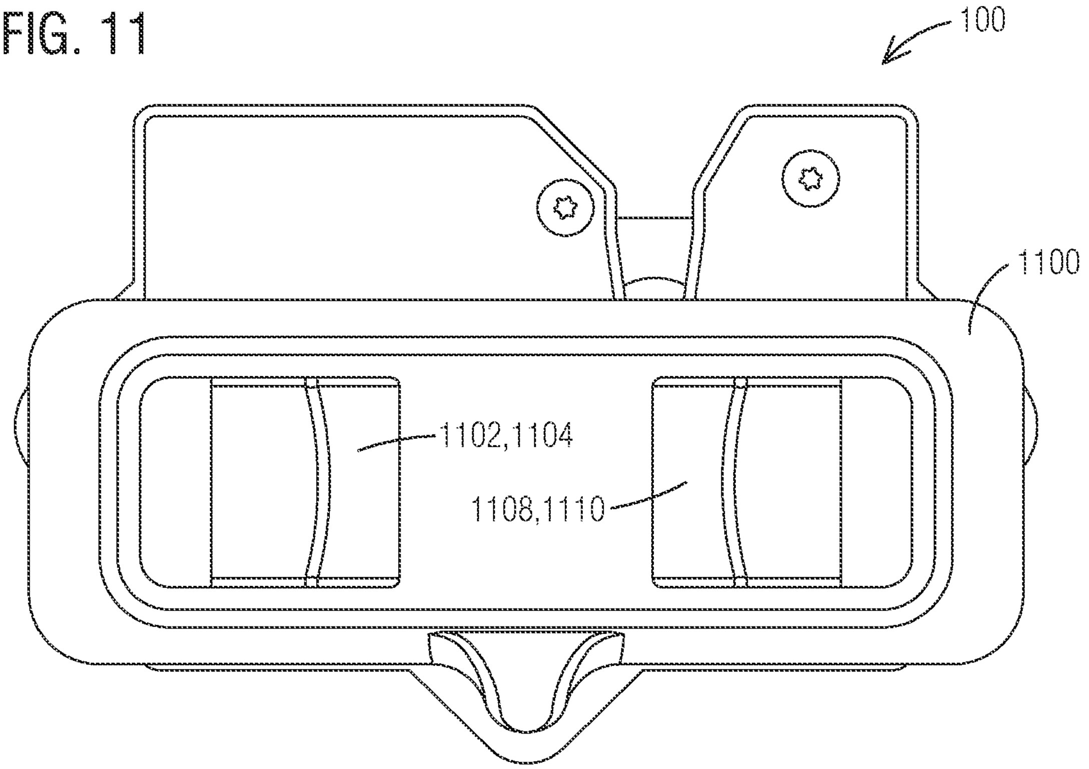
FIG. 11 is a front view of the manual release mechanism of FIG. 1.

FIG. 11 shows the manual release mechanism 100 with a cover 1100 on and with a left button 1102 in a left button closed position 1104 and a right button 1108 biased into a right button closed position 1110.

Figure 12:
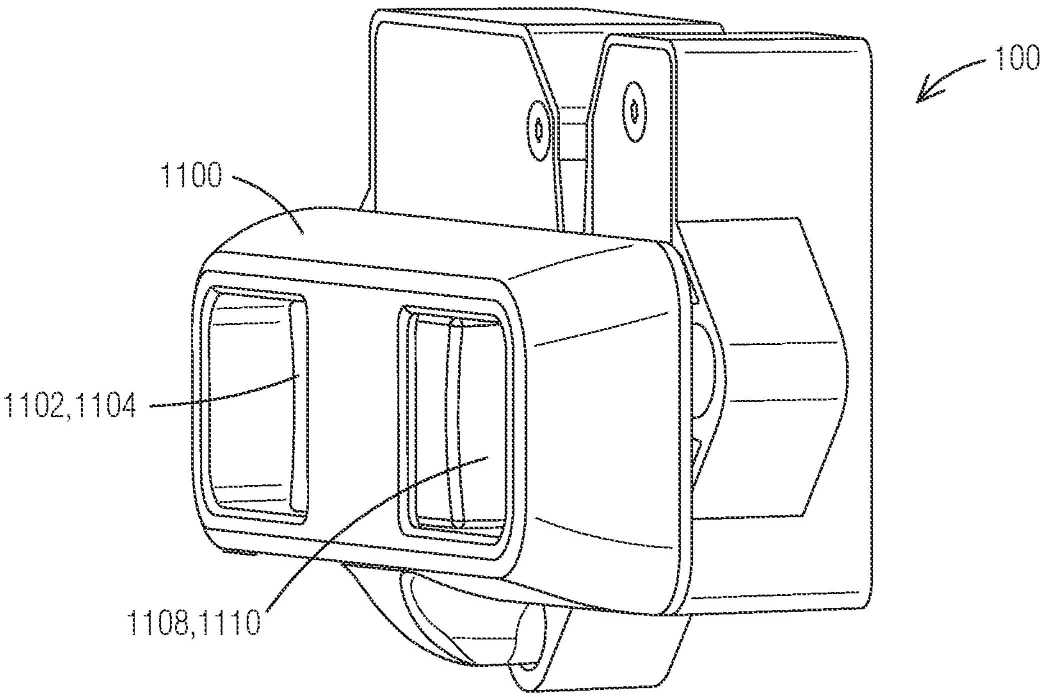
FIG. 12 is a perspective view of the manual release mechanism of FIG. 11.

FIG. 12 is a perspective view of the manual release mechanism 100 showing that the left button 1102 and the right button 1108 are fully recessed within the cover 1100 (escutcheon). Having recessed buttons 1102, 1108 makes it significantly more difficult for wildlife to access both buttons and manually open the lid.

Figure 13:
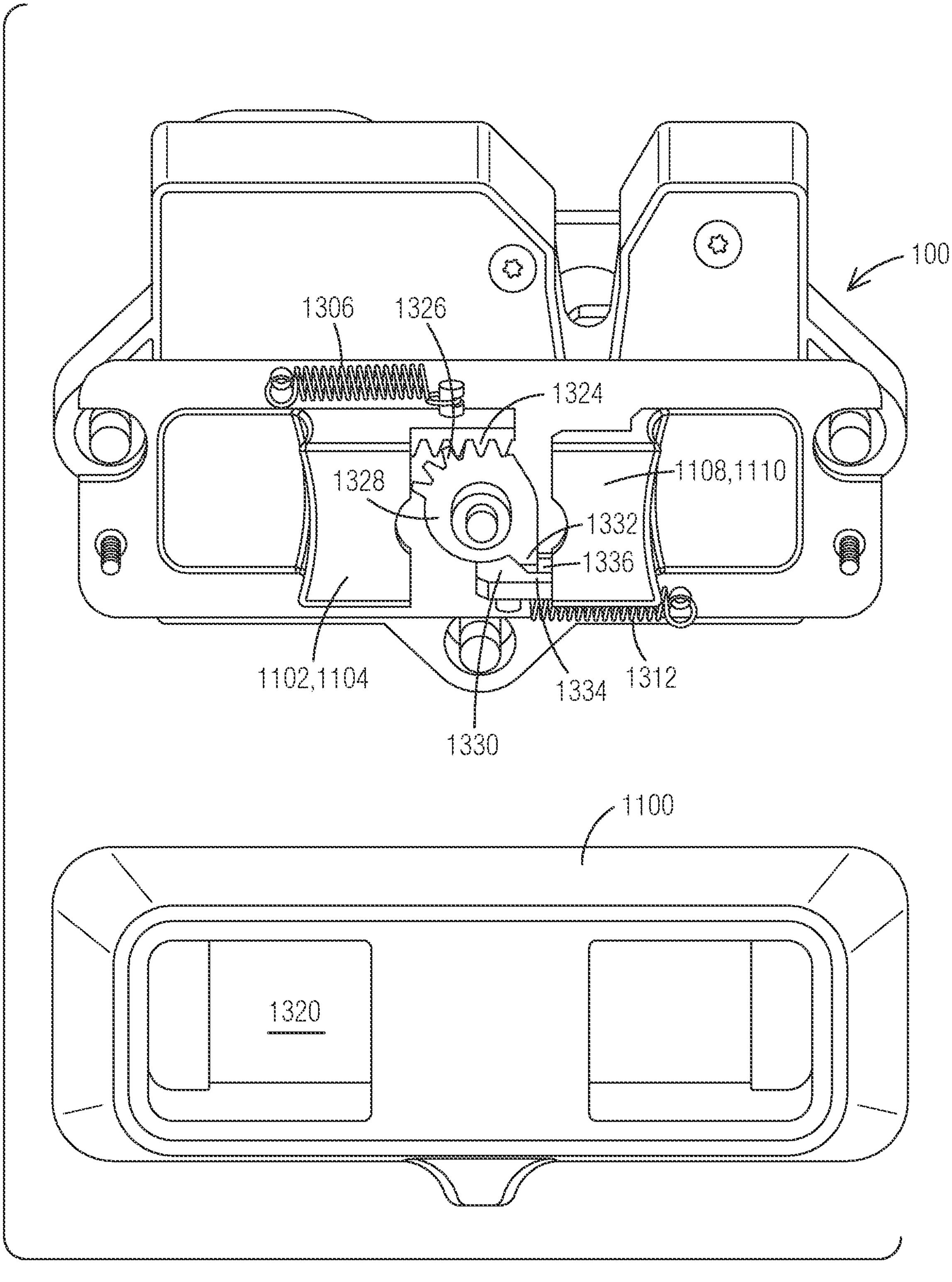
FIG. 13 shows the manual release mechanism of FIG. 11 with the cover removed and the buttons in closed positions.

FIG. 13 shows the manual release mechanism 100 with the cover 1100 removed, the left button 1102 biased into the left button closed position 1104 by a left spring 1306, and the right button 1108 biased into the right button closed position 1110 by a right spring 1312. The buttons 1102, 1108 are arranged to fit inside a recess 1320 in the cover 1100, and the recess 1320 permits linear movement of the buttons 1102, 1108 toward and away from each other therein.

Figure 14:
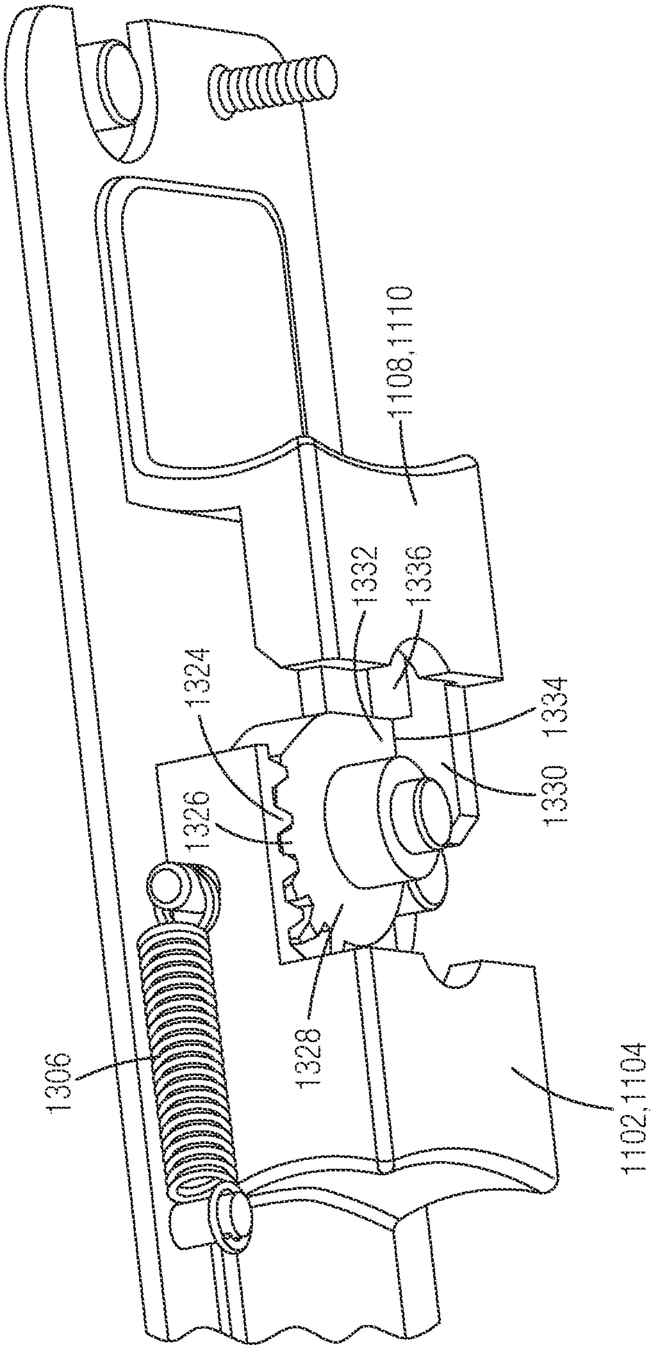
FIG. 14 is a perspective view of the manual release mechanism of FIG. 11.

As can be seen in FIGS. 13 and 14, the left button 1102 includes a rack gear 1324 that engages a spur gear 1326 on an intermediate element 1328. Accordingly, movement of the left button 1102 from the left button closed position 1104 rotates the intermediate element 1328 clockwise when the intermediate element 1328 is free to rotate. Rotation of the intermediate element 1328 causes an engaged hasp assembly 200 to release the staple 404. The right button 1108 includes a button tab 1330 that abuts an element tab 1332 at an interface 1334 when the right button 1108 is in the right button closed position 1110. Movement of the right button 1108 from the right button closed position 1110 moves a button recess 1336 adjacent to the element tab 1332. This movement eliminates the interface 1334 which frees the intermediate element 1328 to rotate but has no other effect on the intermediate element 1328. Movement of the left button 1102 from the left button closed position 1104 (and associated rotation of the intermediate element 1328) is thereby blocked by the right button 1108 when the right button 1108 is in the right button closed position 1110. Movement of the right button 1108 from the right button closed position 1110 does not cause movement of the intermediate element 1328. Accordingly, both buttons 1102 1108 must be moved to effect movement of the intermediate element 1328 and thereby manually release the staple 404. This movement may be simultaneous and/or the right button 1108 may be moved first.

Figure 15:
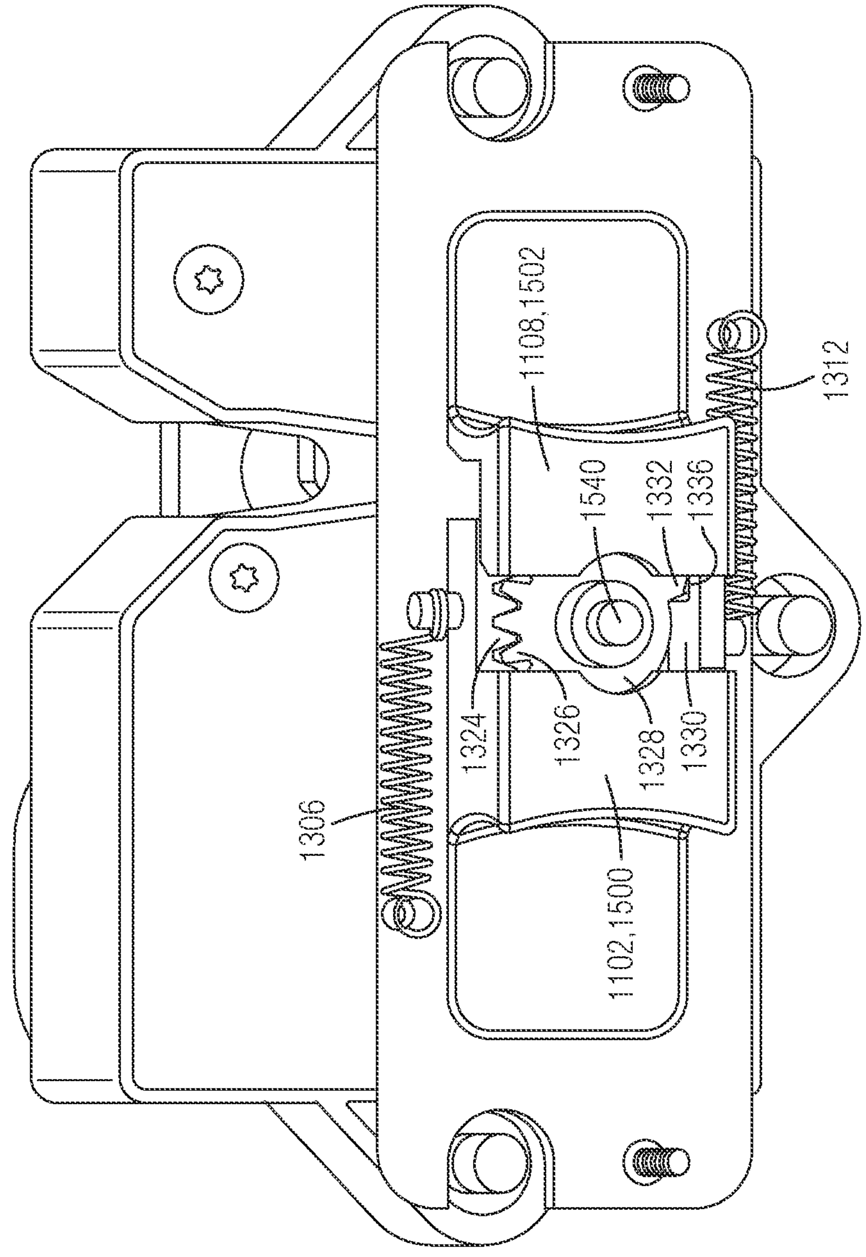
FIG. 15 shows the manual release mechanism of FIG. 11 with the cover removed and the buttons moved toward the open positions.

FIG. 15 shows the manual release mechanism 100 with the cover 1100 removed, the left button 1102 moved to a left button open position 1500, and the right button 1108 moved to a right button open position 1502. The movement of the right button 1108 has freed the intermediate element 1328 to rotate. The movement of the left button 1102 has caused the intermediate element 1328 to rotate. A shaft 1540 of the intermediate element 1322 extends through the manual release mechanism 100 and toward the actuator 320. Rotation of the shaft 1540 causes the hasp assembly 200 to release the staple 404 as is discussed below. Moving both buttons 1102, 1108 toward each other in this pinching manner is natural for humans and yet hard for wildlife to accomplish. This reduces the chances that wildlife will activate the manual release.

Figure 16:
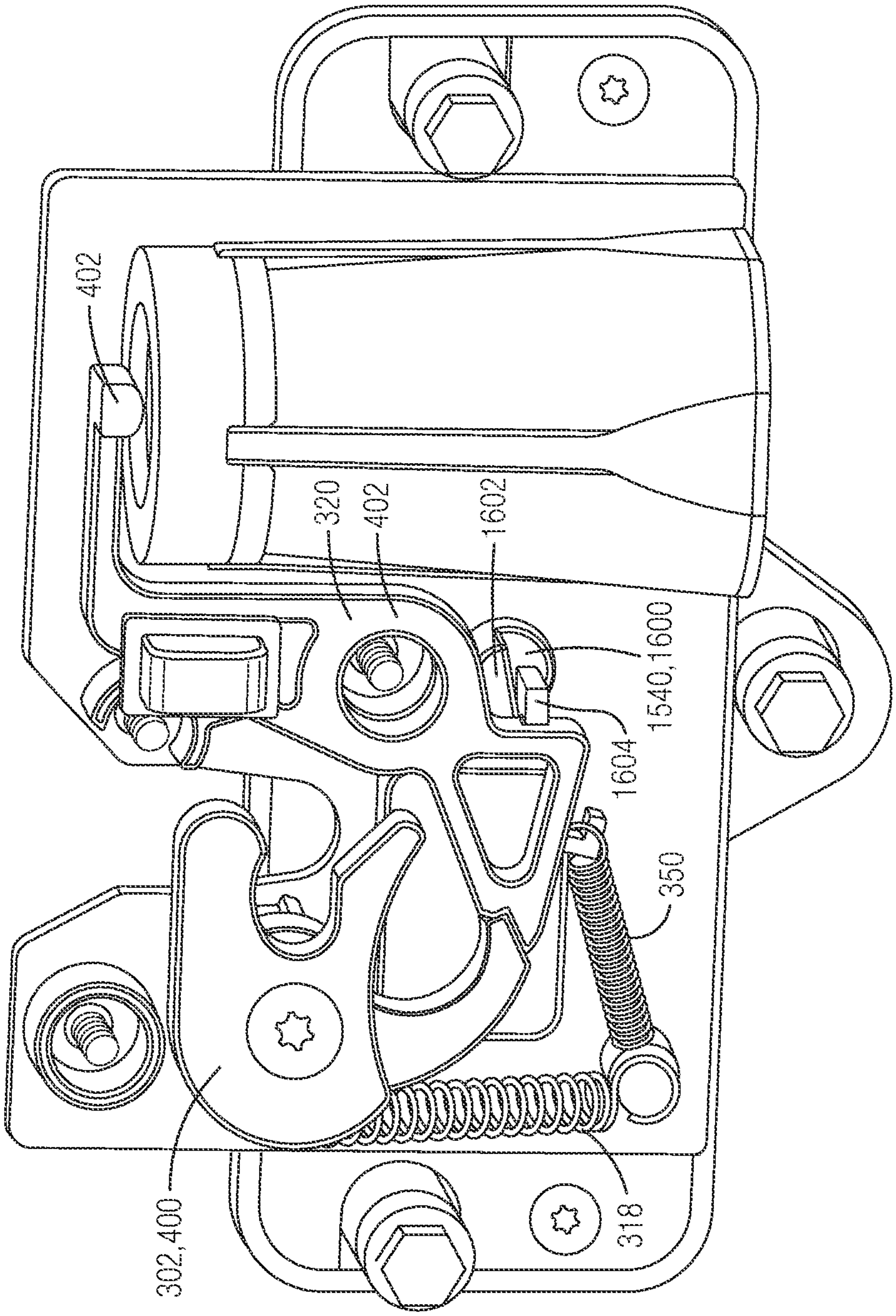
FIG. 16 shows a shaft of the manual release mechanism of FIG. 11 when the manual release mechanism is in the closed configuration.

FIG. 16 is a perspective view of the hasp assembly 200 showing a backside of the manual release mechanism 100 with the hasp 302 in the engaged hasp position 400 and the actuator 320 in the engaged actuator position 402. The shaft 1540 is in a shaft closed position 1600 taken when the left button 1102 is in the left button closed position 1104 and the right button 1108 is in the right button closed position 1110. In the shaft closed position 1600 a shaft tab 1602 on the shaft 1540 does not interfere with an actuator tab 1604 on the actuator 320, thereby permitting the actuator 320 to reach the engaged actuator position 402.

Figure 17:
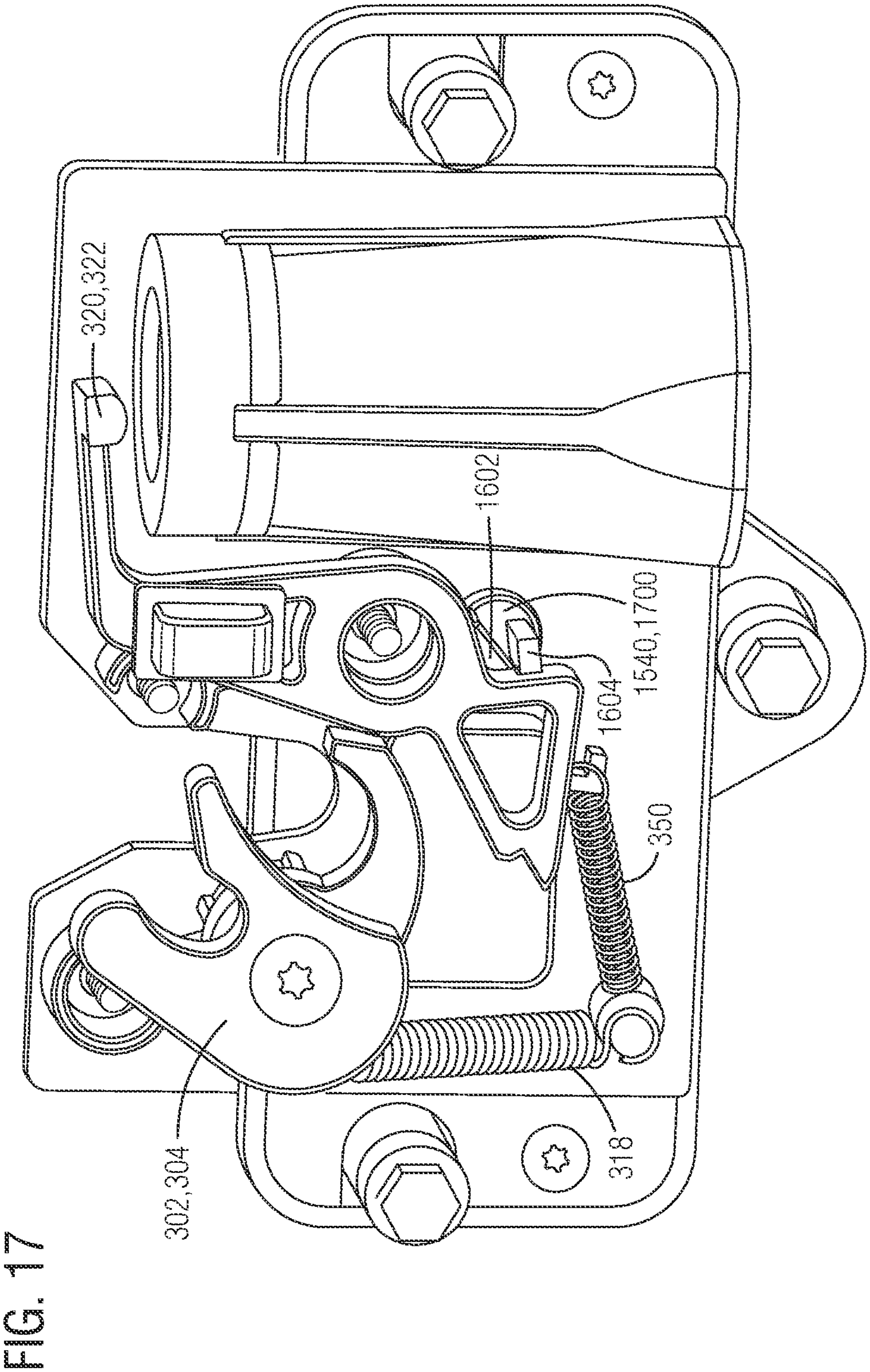
FIG. 17 shows a shaft of the manual release mechanism of FIG. 11 when the manual release mechanism is in the open configuration.

FIG. 17 is a perspective view of the hasp assembly 200 showing the backside of the manual release mechanism 100 with the hasp 302 in the disengaged hasp position 304 and the actuator 320 in the actuated position 322. The shaft 1540 is in a shaft open position 1700 taken when the left button 1102 is in the left button open position 1500 and the right button 1108 is in the right button open position 1502. In the shaft open position 1700 the shaft tab 1602 on the shaft 1540 has pushed the actuator tab 1604 on the actuator 320 to the right (as seen in FIG. 17). This rotated the actuator 320 into the actuated position 322. This releases the hasp 302 and frees the staple 404.

Manual release is also enabled by the internal release tab 326 (FIG. 6) that extends from the actuator 320 into the flexible cap 342. Pushing the flexible cap 342 to the left (as seen in FIG. 17) rotates the actuates the actuator 320 which releases the hasp 302 and staple 404.

Figure 18:
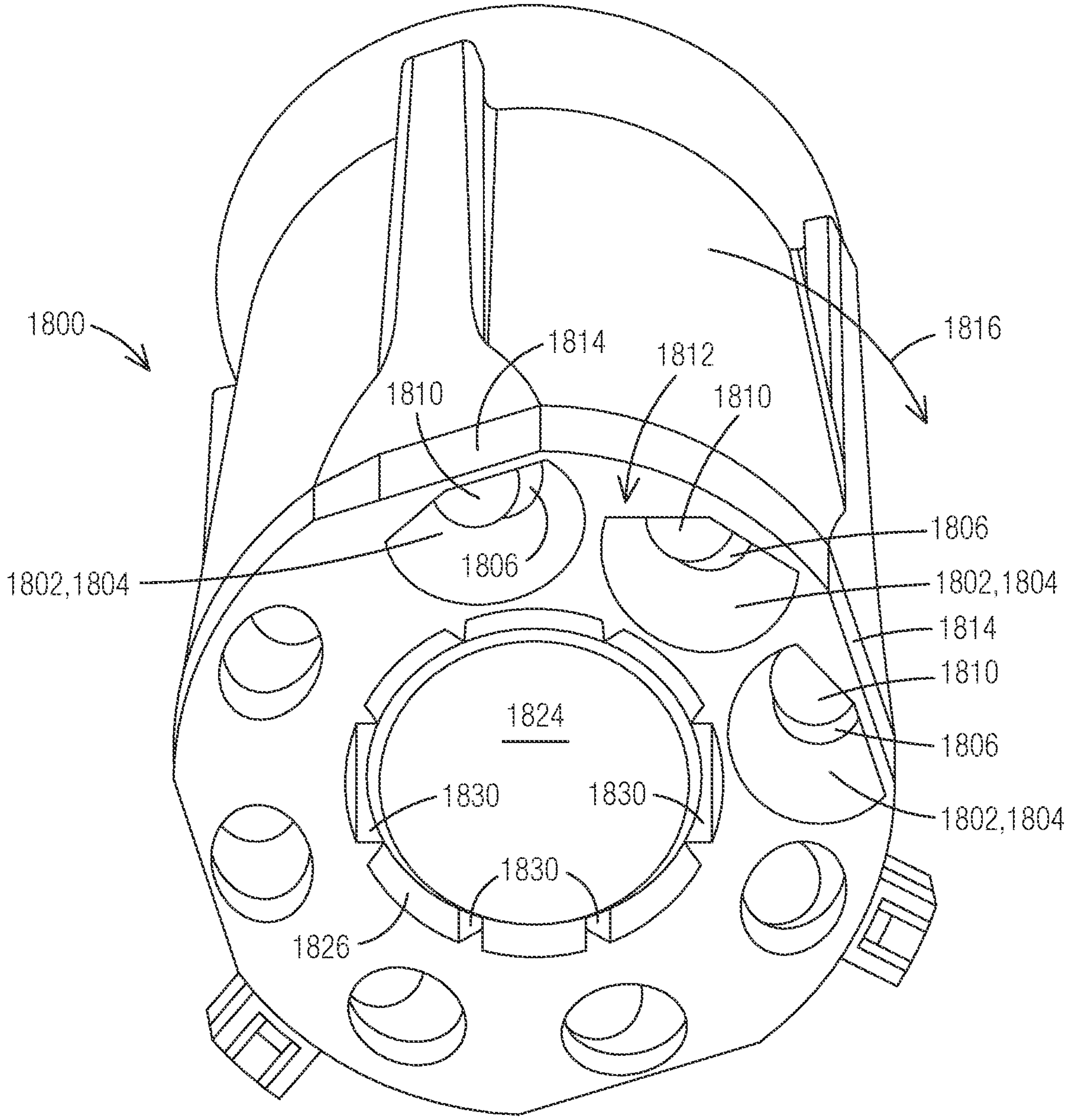
FIG. 18 is a perspective view of an alternate example embodiment of the actuator mechanism.
Figure 19:
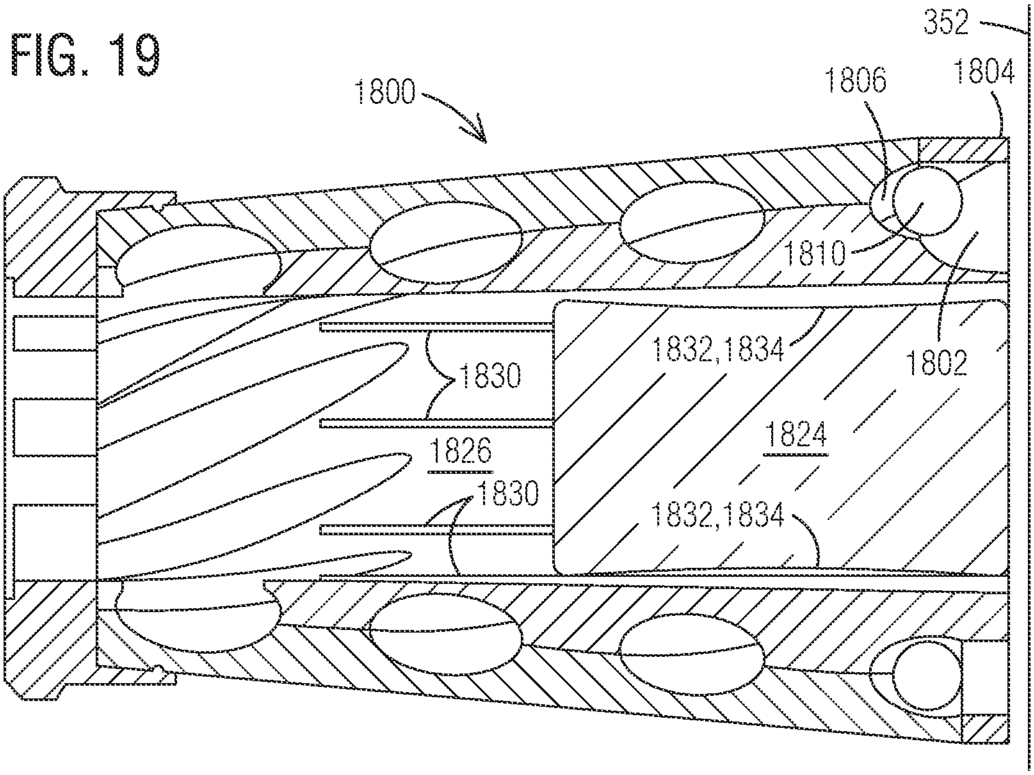
FIG. 19 is a cross section of the actuator mechanism of FIG. 18 in a forward tilt.

FIGS. 18 and 19 show an alternate example embodiment of the actuator mechanism 1800. In this example embodiment, pockets 1802 are disposed at an upstream end 1804 of at least one second passage 1806. In this example embodiment, the pockets 1802 are disposed at the upstream end 1804 of three of the second passages 1806. The three second passages 1806 are the uppermost second passage 1806 and the next two second passages 1806 from the uppermost second passage 1806 in a direction 1816 of the tapered-helix shape of the annular array 1812 when the actuator mechanism 1800 is tilted forward as if during a collection. For example, at a ninety (90) degree forward tilt associated with a collection, the three second passages 1806 with pockets 1802 would be the second passage 1806 approximately at the twelve o-clock position, the second passage 1806 approximately at the three o-clock position, and the second passage 1806 in between as is shown in FIG. 18. As detailed above, these are second passages 1806 in which the respective second element 1810 will roll during appropriate forward tilting conditions associated with collection. Stated alternately, when the actuator mechanism 1800 is tilted in the forward direction associated with collection, at least one of the pockets 1802 will be located anywhere from a top 1810 of the annular array 1812 to a location 1814 that is ninety degrees from the top 1810 of the annular array 1812 in the direction 1816 of the tapered-helix shape of the annular array 1812. In this example embodiment, all three of the pockets 1802 are located from the top 1810 of the annular array 1812 to the location 1814 that is ninety degrees from the top 1810 of the annular array 1812 in the direction 1816 of the tapered-helix shape of the annular array 1812.

The pockets 1802 interact with their respective second elements 1810 in one way during a forward tilt associated with a collection and in a different way during a forward tilt not associated with refuse collection, such as wildlife efforts to open the container 108.

During a collection tilt there is a relatively smooth forward tilting motion from the vertical orientation until reaching a fully-tilted position. During a conventional collection, the fully-tilted position may be e.g. approximately 170 degrees from the vertical orientation. During this relatively smooth forward tilt, the pockets 1802 hold the second elements 1810 therein until a threshold angle is reached. In an example embodiment, the threshold angle is approximately 100 to 110 degrees. In contrast, there is nothing to hold the first element 1824 in its home position, so it is free to begin moving down the first passage 1826 during a collection tilt before the second elements 1810 leave their respective pockets 1802. This delay of the second elements 1810 helps ensure the unblocked arrangement such as that shown in FIG. 9 results, in which case the first element 1824 reaches and actuates the release element 328 of the actuator 320, thereby releasing the staple 404 and associated lid for collection. In other words, the pockets 1802 delay the initiation of movement of the second elements 1810 down the second passages 1806 during a collection tilt and which helps ensure the first element 1824 is not blocked by the second elements 1810.

During a forward tilt not associated with refuse collection, such as wildlife efforts to open the container 108, if the container 108 is pushed over in the forward direction, the container 180 will rotate about ninety (90) degrees from the vertical orientation and then come to an abrupt stop upon hitting the ground. This abrupt stop has been proven during tests to often cause the second elements 1810 to bounce about in their respective pockets 1802 with the result that at least one of the three second elements 1810 enters its second passage 1806 and gravity urges the second element 1810 to travel down that second passage 1806. In contrast, since the first element 1824 is oriented horizontally that the same time, gravity does not urge the first element 1824 toward the release element 328. Further, the first element 1824 typically does not have enough momentum in this scenario to move appreciably toward the release element 328. This results in the blocked arrangement as shown in FIG. 10 because the second element 1810 is able to get ahead of the first element 1824 and thereby block the first element's 1824 access to the release element 328 of the actuator 320.

The pockets 1802 thereby increase the likelihood of releasing the staple 404 during forward tilt conditions associated with collection, while decreasing the likelihood of releasing the staple 404 during forward tilt conditions not associated with collection, such as wildlife efforts to open the container 108.

Also shown in this example embodiment are optional fingers 1830 (raised ridges). These fingers 1830 are intended to reduce friction with the first element 1824 and thereby facilitate movement of the first element 1824 along the first passage 1826. In addition, in this example embodiment a side 1832 the first element 1824 is shown with an optional concave profile 1834. This is also intended to reduce friction with the first element 1824 and thereby facilitate movement of the first element 1824 along the first passage 1826.

Figure 20:
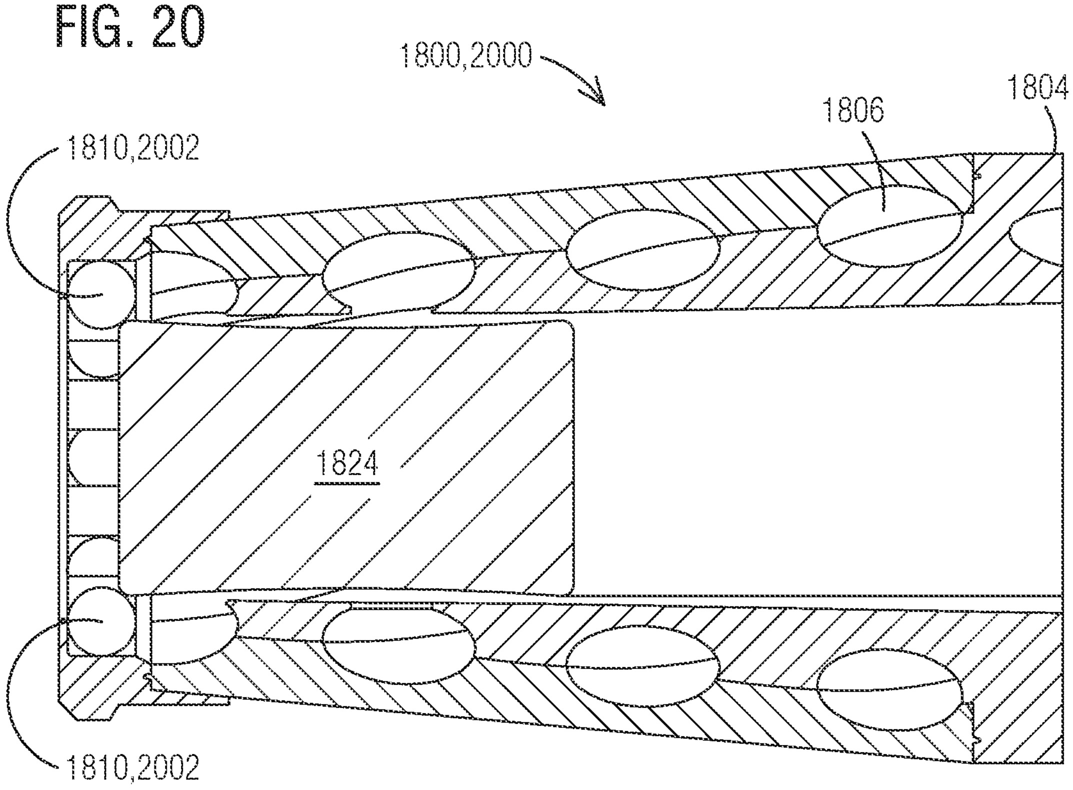
FIG. 20 is a cross section of the actuator mechanism of FIG. 18 in a forward tilt with the first element blocked by the second element.

FIG. 20 shows the actuator mechanism 1800 in the tilted orientation 2000 with the first element 1824 being blocked by the second element 1810. This blocked arrangement is possible because the second element 1810 reached the terminal position 2002 and blocked the first element 1824 from passing the second element 1810. Hence, as above, when the second element 1810 blocks the first element 1824, the first element 1824 cannot reach the release element 328 of the actuator 320. When the first element 1824 cannot reach the release element 328, the actuator 320 will not actuate and the hasp 302 will not release. As above, this occurs under tilting conditions not associated with refuse collection, such as wildlife efforts to open the container 108.

Figure 21:
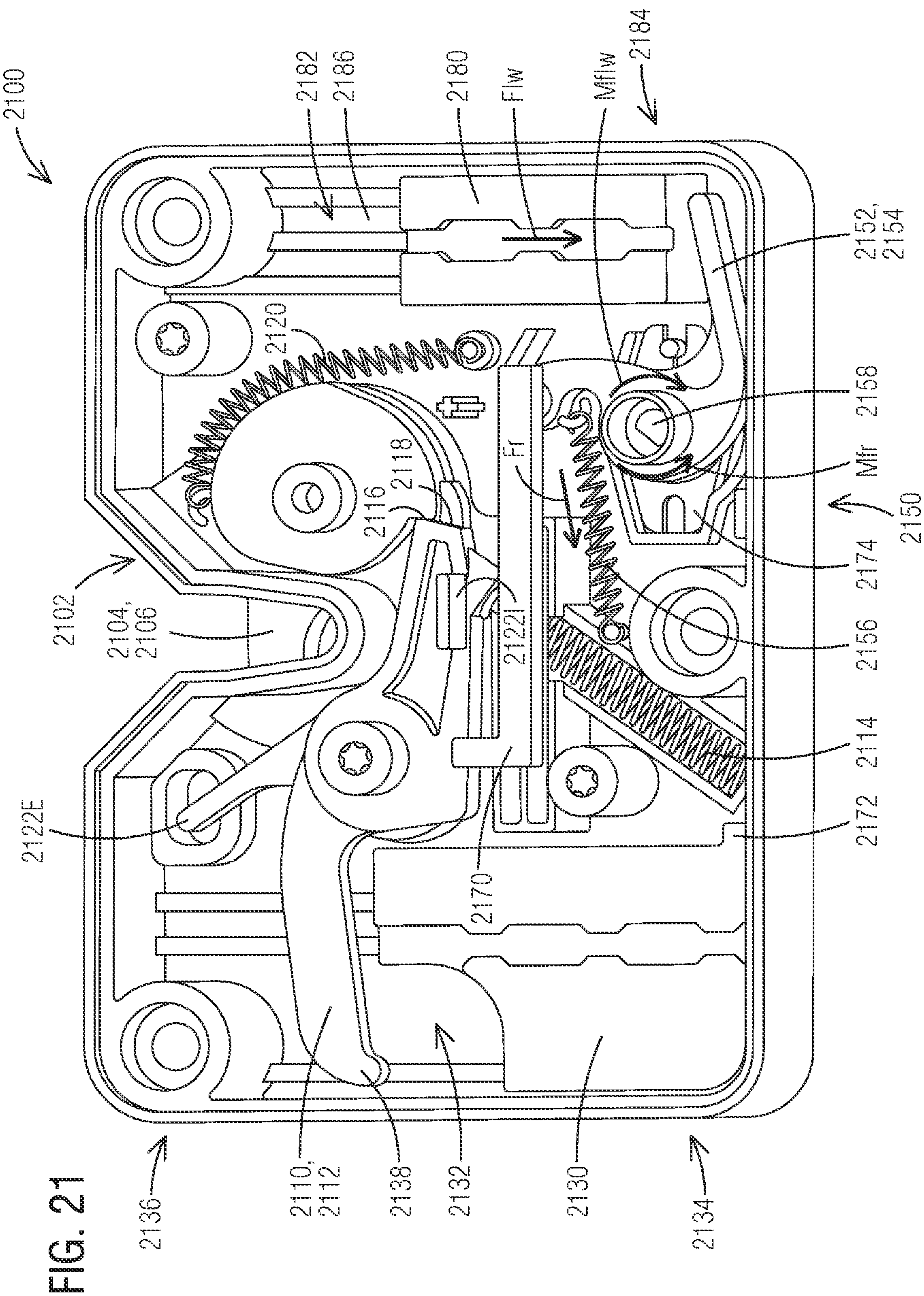
FIG. 21 shows an alternate example embodiment of a latch assembly with an example embodiment of an example embodiment of a time delay lock assembly in a ready configuration.

FIG. 21 shows an alternate example embodiment of a latch assembly 2100 with an example embodiment of an example embodiment of a time delay lock assembly 2150 in a ready configuration. The latch assembly 2100 includes a hasp assembly 2102 that includes a hasp 2104 configured to retain a staple (not shown) therein when the hasp 2104 is in an engaged position 2106; and an actuator 2110 that is biased toward a locking position 2112 configured to lock the hasp 2104 in the engaged position 2106. This hasp assembly 2102 functions similar to that of the embodiment of FIG. 3 and FIG. 4. The actuator 2110 rides on the hasp 2104 as the hasp 2104 rotates counterclockwise until the hasp 2104 reaches the engaged position 2106. At that point the actuator 2110 can reach the locking position 2112 under the bias of an actuator resilient element 2114 (e.g., a spring in compression). In the locking position 2112, a hasp tab 2116 engages an actuator catch 2118 and a bias of a hasp resilient element 2120 (e.g., a spring in tension) maintains the engagement therebetween. This locks the hasp 2104 in the engaged position 2106. An external manual release 2122E and an internal manual release 2122I can be used to manually disengage the actuator 2110 from the hasp 2104 and thereby release the staple.

The latch assembly 2100 further includes an actuator weight 2130 disposed in an actuator weight passage 2132. Under various circumstances the actuator weight 2130 can move between an actuator weight home position 2134 and an unlocking position 2136. In an example embodiment, the home position 2134 is disposed relatively lower than the unlocking position 2136 and gravity urges the actuator weight 2130 into the home position 2134 when the latch assembly 2100 is in the upright orientation. Alternately, when in the upright position the actuator weight 2130 is configured to at least not be urged toward the unlocking position 2136. When the latch assembly 2100 is tilted from the upright orientation by more than an actuator weight threshold amount (e.g., ninety (90) degrees), gravity urges the actuator weight 2130 toward the unlocking position 2136. Enroute to the unlocking position 2136, the actuator weight 2130 will contact an actuator release element 2138. If the actuator weight 2130 exerts sufficient force to overcome the engagement between the actuator 2110 and the hasp 2104 and then actually reaches the unlocking position 2136, the actuator 2110 will disengage from the hasp 2104 and thereby release the staple.

In this example embodiment, the actuator weight threshold amount of tilt of ninety (90) degrees is chosen because during a typical collection operation, the latch assembly 2100 will be tilted more than ninety (90) degrees. In contrast, in many instances of tampering by wildlife, the latch assembly 2100 may be knocked over ninety (90) degrees to a horizontal position, but rarely much further. In those tampering instances, the actuator weight 2130 may not move from the actuator weight home position 2134, or it may be jostled from the actuator weight home position 2134 but it will probably not reach the actuator release element 2138 with enough force/momentum to cause the actuator 2110 to disengage from the hasp 2104 and thereby release the staple. In alternate example embodiments, the actuator weight passage 2132 can be angled or conical in a way that would cause gravity to urge the actuator weight 2130 toward the actuator release element 2138 when the latch apparatus is tilted less of than ninety (90) degrees.

The latch assembly 2100 further includes a time delay lock assembly 2150 configured to be initiated when the latch assembly 2100 is moved from the upright orientation by a time delay lock threshold amount of tilt and configured to prevent movement of the actuator weight 2130 only after initiation and a time delay. Movement of the actuator weight 2130 into the unlocking position 2136 before an end of the time delay disengages the actuator 2110 from the hasp 2104, and thereby unlocks the hasp 2104 from the engaged position 2106. Alternately, expiration of the time delay before the actuator weight 2130 reaches the unlocking position 2136 prevents the actuator weight 2130 from reaching the unlocking position 2136 and disengaging the hasp 2104. Upon returning the time delay lock assembly 2150 to an upright orientation that is under the time delay lock threshold amount of tilt, the actuator weight 2130 will be freed and will return to the actuator weight home position 2134.

Figure 22:
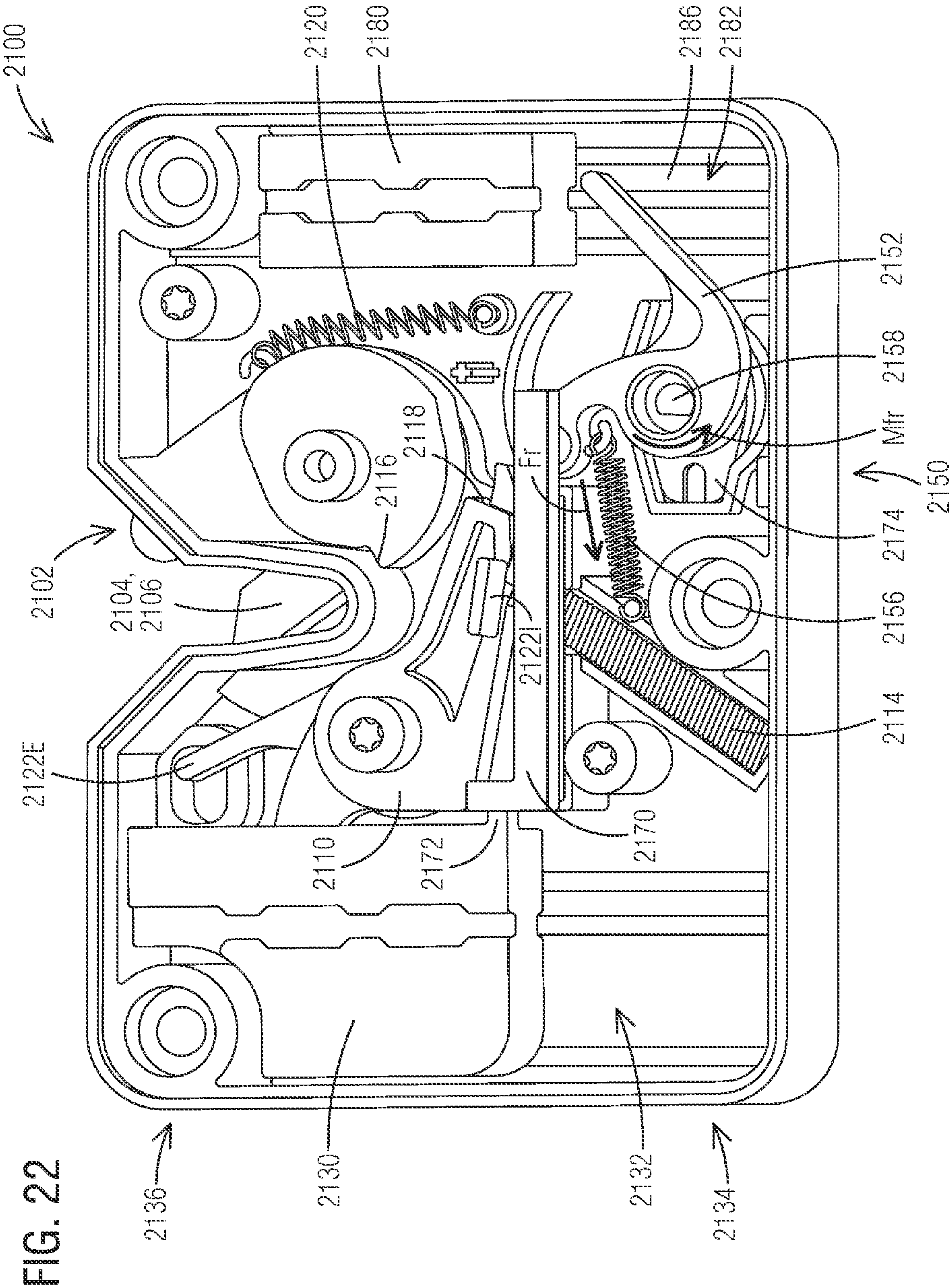
FIG. 22 shows the latch assembly of FIG. 21 with the actuator weight in an unlocking position and the time delay lock assembly in a braking configuration.
Figure 23:
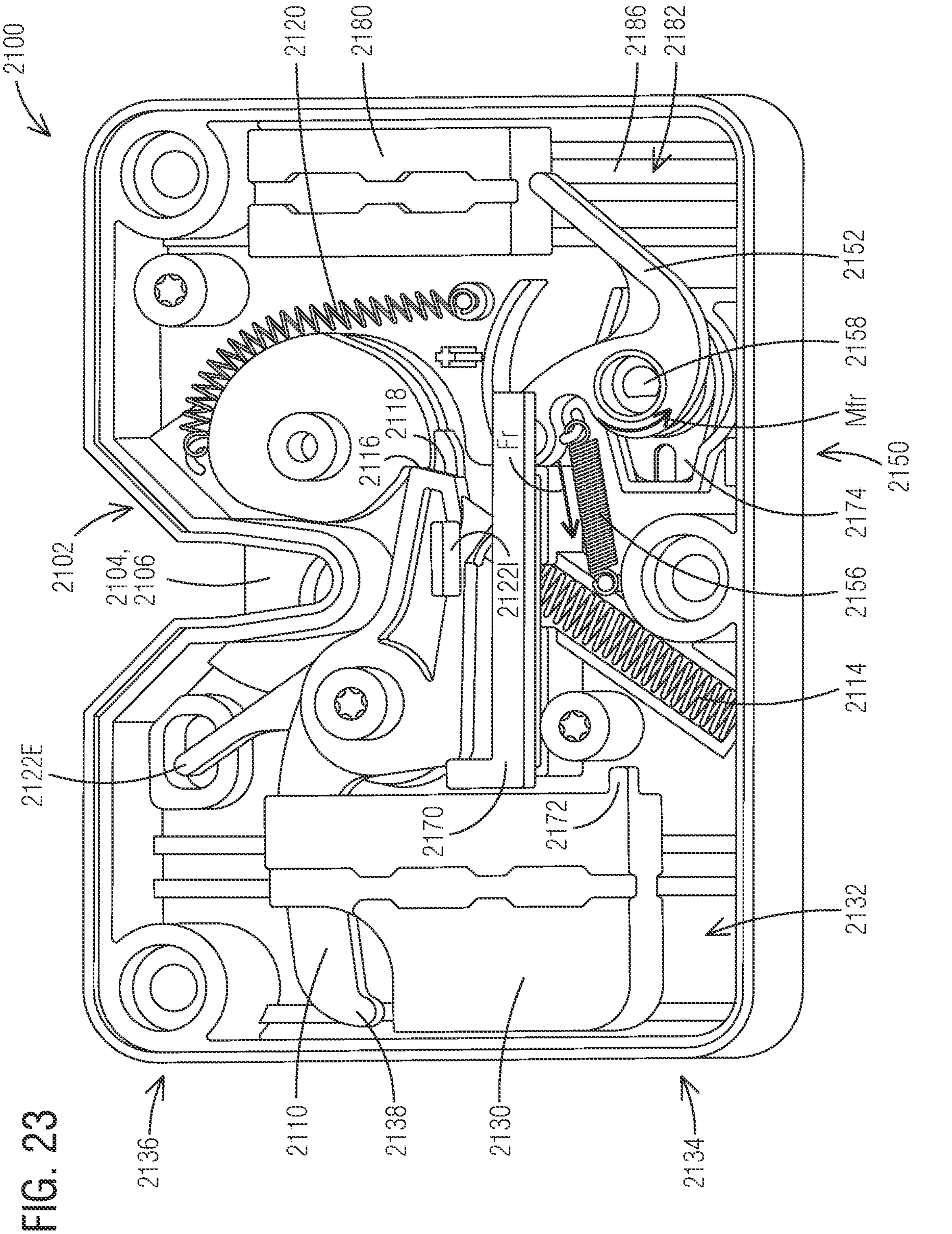
FIG. 23 shows the latch assembly of FIG. 21 with the actuator weight between an actuator weight home position and the unlocking position and the time delay lock assembly in the braking configuration.

The time delay lock assembly 2150 includes a lock assembly arm 2152 configured to be moved in and out of a ready position 2154; a lock assembly arm resilient element 2156 (e.g., a spring under tension) secured to and configured to urge the lock assembly arm 2152 away from the ready position 2154 (e.g., counterclockwise about lock assembly arm stud 2158) with a resilient force Fr; and a brake 2170 secured to and configured to move with the lock assembly arm 2152 and configured to make contact with and prevent movement of the actuator weight 2130 upon reaching a braking position (see FIG. 22 and FIG. 23). If the brake 2170 reaches the braking position before the actuator weight 2130 reaches the unlocking position 2136, the brake 2170 will hold the actuator weight 2130 so the actuator weight 2130 cannot then move into the unlocking position 2136. If the actuator weight 2130 is already in the unlocking position 2136, the brake 2170 will simply hold the actuator weight 2130 in the unlocking position 2136. Direct contact between the brake 2170 and the actuator weight 2130 is shown, but not required.

The actuator weight comprises an interlock feature 2172 (e.g., a protrusion/tab). The interlock feature 2172 is configured to interact with the brake 2170 when the brake 2170 is in the braking position and the actuator weight 2130 is not in the unlocking position 2136 in a way that prevents the actuator weight 2130 from moving into the unlocking position 2136 while being braked.

The time delay lock assembly 2150 further includes a damper 2174 secured to and configured to dampen (e.g., slow down) movement of the lock assembly arm 2152 away 2170 about the lock assembly arm stud 2158. In this example embodiment, the damper 2174 is a rotary damper that dampens motion of the lock assembly arm stud 2158, which is keyed to the lock assembly arm 2152. Upon an initiation of the time delay lock assembly 2150, the lock assembly arm 2152 is freed to begin moving counterclockwise from the ready position 2154. The damper 2174 slows the counterclockwise movement of the lock assembly arm 2152 and thereby also slows the leftward movement of the brake 2170 that moves with the lock assembly arm 2152. The time it takes from the initiation until the brake 2170 reaches the braking position constitutes the time delay.

Factors that influence a magnitude of the time delay include a damping force of the damper 2174, a resilient force of the lock assembly arm resilient element 2156, and where the lock assembly arm resilient element 2156 is secured to the lock assembly arm 2152 relative to the lock assembly arm stud 2158, inter alia.

The latch assembly 2100 further includes a lock weight 2180 that controls initiation of the time delay lock assembly 2150. The lock weight 2180 is disposed in a lock weight passage 2182. Under various circumstances, the lock weight 2180 can move between a lock weight home position 2184 and various other positions in the lock weight passage 2182. In an example embodiment, when the latch assembly 2100 is in the upright orientation the lock weight home position 2184 is disposed lower than the various other positions.

When the latch assembly 2100 is in the upright orientation, gravity urges the lock weight 2180 into the lock weight home position 2184 and the lock weight 2180 exerts a lock weight force Flw on the lock assembly arm 2152 that overcomes the resilient force Fr of the lock assembly arm resilient element 2156. This holds the lock assembly arm 2152 in the ready position 2154 shown. The lock weight force Flw can include a variety of components, including any combination of an apparent weight of the lock weight 2180 (a amount of the weight of the lock weight 2180 that is felt by the lock assembly arm 2152), friction between the lock weight 2180 and the side wall 2186, inertia, and momentum, inter alia. As the latch assembly 2100 is progressively tilted from the upright orientation, a magnitude lock weight force Flw that the lock weight 2180 exerts on the lock assembly arm 2152 progressively decreases. This is at least because the apparent weight of the lock weight 2180 (the portion of the lock weight's weight that the lock assembly arm 2152 experiences) decreases progressively with increased tilting. In this example embodiment, in the upright orientation the lock assembly arm 2152 experiences the full weight of the lock weight 2180. As the apparatus 2100 is tilted, the weight of the lock weight 2180 transfers from the lock assembly arm 2152 to the sidewall 2186. Tilting the latch assembly 2100 ninety (90) degrees reduces the magnitude of the apparent weight component of the lock weight force Flw to zero because at ninety (90) degrees the full weight of the lock weight 2180 is exerted on a sidewall 2186 of the lock weight passage 2182.

The lock weight force Flw generates a clockwise lock weight moment Mflw on the lock assembly arm 2152. The lock assembly arm resilient element 2156 generates a counterclockwise resilient element moment Mfr on the lock assembly arm 2152. As the latch assembly 2100 is tilted, the lock weight force Flw and associated clockwise lock weight moment Mflw decrease in magnitude. Upon reaching a time delay lock threshold amount of tilt, the magnitude of the clockwise lock weight moment Mflw falls below the magnitude of the counterclockwise resilient element moment Mfr. The greater counterclockwise resilient element moment Mfr then overcomes the clockwise lock weight moment Mflw and the lock assembly arm 2152 begins to rotate counterclockwise and lift the lock weight 2180, which constitutes initiation of the time delay lock assembly 2150.

Further tilting of the time delay lock assembly 2150 will further decrease the clockwise lock weight moment Mflw on the lock assembly arm 2152. An increased difference between the greater magnitude of the counterclockwise resilient element moment Mflw and the lesser magnitude of the clockwise lock weight moment Mfr will increase the speed of the counterclockwise movement of the lock assembly arm 2152. At a tilt angle of ninety (90) degrees, the apparent weight component of the lock weight force Flw reaches zero and the time delay is thereby relatively short compared to the time delay at the time delay lock threshold amount of tilt. At tilt angles greater than ninety (90) degrees, gravity acts to pull the lock weight 2180 away from (off of) the lock weight arm 2152, thereby reducing the frictional resistance component. This further increases a difference between the moments which, in turn, further reduces the time delay.

Between the time delay lock threshold amount of tilt and ninety (90) degrees of tilt, the counterclockwise resilient element moment Mfr exerted by the lock assembly arm resilient element 2156 is resisted by both the damper 2174 and progressively lower respective magnitudes of the clockwise lock weight moment Mflw. As such, the time delay is greatest at the time delay lock threshold amount of tilt (when the clockwise lock weight moment Mflw is greatest and most resists the counterclockwise resilient element moment Mfr) and is relatively lower at ninety (90) degrees or more of tilt (when the clockwise lock weight moment Mflw is significantly reduced because the apparent weight component of the lock weight force Flw reaches zero and the associated clockwise lock weight moment Mflw thereby provides reduced resistance to the counterclockwise resilient element moment Mfr). The time delay is configured to be slightly longer than the time associated with collection operations. This permits unlocking of the hasp during collection operations but prevents unlocking of the hasp during most other types of tiltings which usually take longer than collection operations and/or do not tilt as far as during collection operations.

FIG. 22 shows the latch assembly 2100 of FIG. 21 with the actuator weight 2130 in the unlocking position 2136 and the time delay lock assembly 2150 in the braking configuration. FIG. 22 represents an example configuration of the latch assembly 2100 as it exists at a full tilt during a collection operation (i.e., more than ninety (90) degrees) although it is shown upright for clarity. The actuator weight 2130 has moved from the actuator weight home position 2134 into contact with the actuator release element 2138 with sufficient force to overcome the engagement between the actuator 2110 and the hasp 2104. This permitted the actuator weight 2130 to reach the actuator weight unlocking position 2136, the hasp 2104 to be released, and the cover to open. During the collection operation, the apparent weight component of the lock weight force Flw exerted on the lock assembly arm 2152 reduced and the associated clockwise lock weight moment Mflw decreased. This triggered the counterclockwise movement of the lock assembly arm 2152 which, in turn, moved the brake 2170 left. After the time delay created by the damper 2174 damping the counterclockwise movement of the lock assembly arm 2152, the brake reached/abutted the actuator weight 2130 and thereby prevented the actuator weight 2130 from subsequent movement. Since the actuator weight 2130 was already in the unlocking position 2136 and the hasp released, this braking did not interfere with the collection operation. In this example configuration of the example embodiment, the brake 2170 abuts the interlock feature 2172, but this is not required.

Once the collection operation is complete, the latch assembly 2100 will be returned to the upright orientation and the lock weight 2180 will return to the lock weight home position 2184, which will rotate the lock assembly arm 2152 clockwise. This, in turn, will pull the brake 2170 to the right and release the actuator weight 2130. The actuator weight 2130 will return to the actuator weight home position 2134, the cover and staple will close and force the hasp 2104 into the engaged position 2106, and the hasp tab 2116 of the actuator 2110 will re-engage with the actuator catch 2118 of the hasp 2104 and thereby lock the hasp 2104 into the locking position 2112.

It is possible that the events in the above-described sequence may happen out of order. For example, the lid and staple may forcefully close on the container before the time delay lock assembly 2150 releases the actuator weight 2130. In such an instance, the actuator 2110 may simply not re-engage the hasp 2104 until the time delay lock assembly 2150 releases the actuator weight 2130, which then frees the actuator 2110 to rotate and engage the hasp 2104. Alternately, if the actuator resilient element 2114 is selected to exert a sufficient force, the actuator resilient element 2114 may force the actuator 2110 to rotate and engage with the hasp 2104 by overcoming a braking force between the brake 2170 and the actuator weight 2130.

FIG. 23 shows the latch assembly 2100 of FIG. 21 with the actuator weight 2130 between an actuator weight home position 2134 and the unlocking position 2136 and the time delay lock assembly 2150 in the braking configuration. FIG. 23 represents an example configuration of the latch assembly 2100 as it exists after the container is knocked over (e.g., tilted by ninety (90) degrees) and comes to a rest on the ground. It is shown upright for clarity. The actuator weight 2130 has been jostled from the actuator weight home position 2134. As the latch assembly 2100 tilted past the time delay lock threshold amount of tilt and reached ninety (90) degrees of tilt, the apparent weight component of the lock weight force Flw exerted on the lock assembly arm 2152 reduced and the associated clockwise lock weight moment Mflw decreased. This triggered the counterclockwise movement of the lock assembly arm 2152 which, in turn, moved the brake 2170 left. After the time delay created by the damper 2174 damping the counterclockwise movement of the lock assembly arm 2152, the brake reached/abutted the actuator weight 2130 and thereby prevented the actuator weight 2130 from subsequent movement. Preventing subsequent motion prevents the actuator weight 2130 from subsequent moving into the unlocking position 2136. The actuator 2110 will not disengage from the hasp 2104 and the hasp 2104 will not release the staple/cover and the container remains secure. Subsequent further tilting beyond ninety (90) degrees will not release the hasp 2104 because the brake 2170 will continue to hold the actuator weight 2130 in place.

In this example configuration of the example embodiment, the brake 2170 abuts the actuator weight 2130 downstream of the interlock feature 2172 with respect to a direction of travel of the actuator weight 2130. In an event where the frictional braking force between the brake 2170 and the actuator weight 2130 is overcome and the actuator weight moves toward the unlocking position 2136, physical interference between the interlock feature 2172 and the brake will block the actuator weight 2130 from reaching the unlocking position 2136.

Here again, returning the latch assembly 2100 to the upright orientation will reset the components of the latch assembly.

Figure 24:
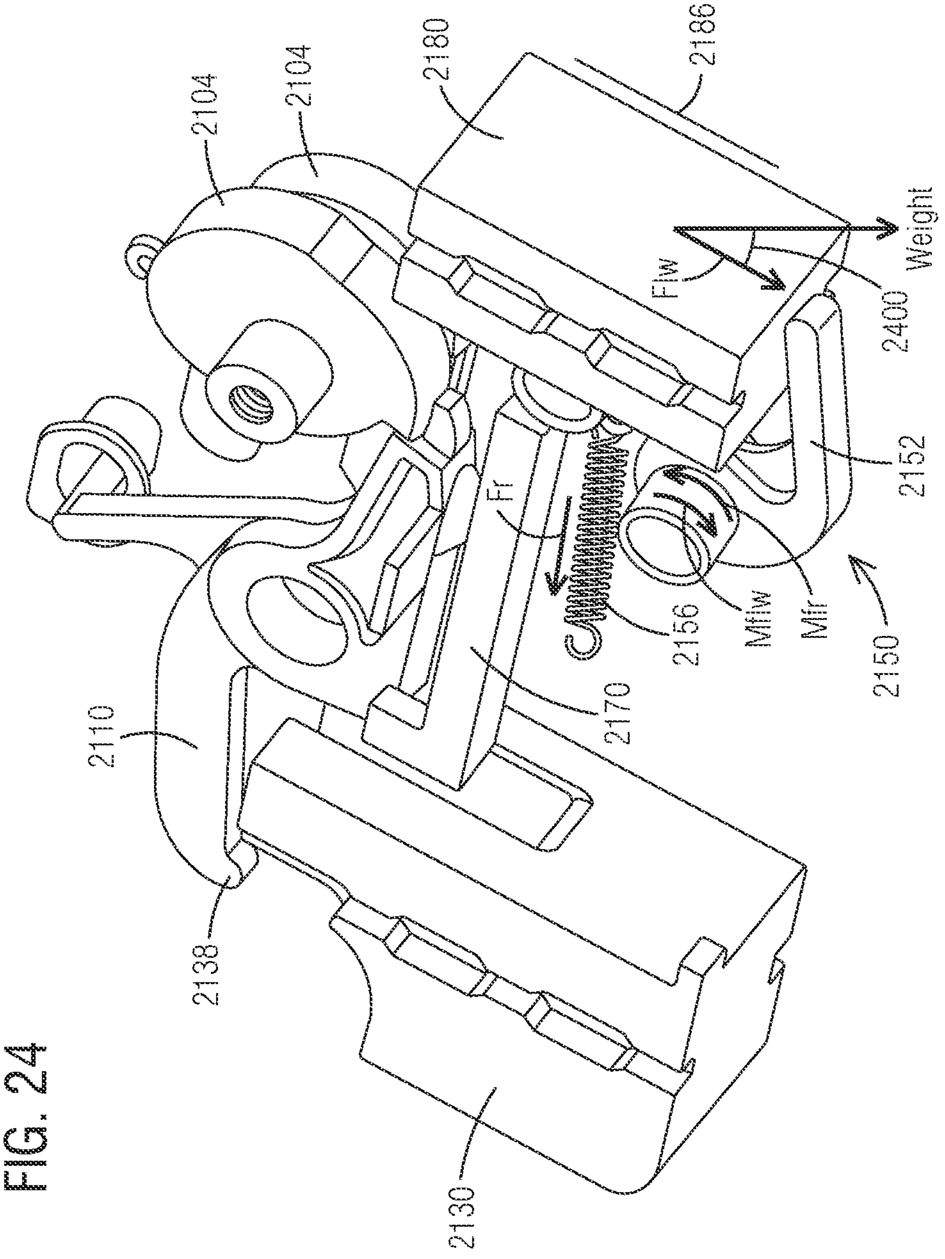
FIG. 24 shows select parts of the latch assembly of FIG. 21 just reaching a time delay lock threshold amount of tilt.

FIG. 24 shows select parts of the latch assembly of FIG. 21 just reaching a time delay lock threshold amount of tilt 2400 from the upright orientation (e.g., vertical). While tilting from the upright orientation to the time delay lock threshold amount of tilt 2400, the lock weight force Flw exerted by the lock weight 2180 on the lock assembly arm 2152 decreases. This is because the weight of the lock weight transfers progressively from the lock assembly arm 2152 to the sidewall 2186 with the increasing tilting. This is true for forward, backward, left, and right tilting. Likewise, the associated clockwise lock weight moment Mflw progressively decreases with increasing tilting. At the time delay lock threshold amount of tilt 2400 shown (e.g., less than ninety (90) degrees), the lock weight force Flw reaches a lock weight force threshold magnitude. At the lock weight force threshold magnitude, the magnitude of the associated clockwise lock weight moment Mflw is minimally sufficiently below the magnitude of the counterclockwise resilient element moment Mfr, which has remained constant from the upright orientation to the time delay lock threshold amount of tilt 2400. The minimally sufficiently greater counterclockwise resilient element moment Mfr overcomes the counterclockwise resilient element moment Mfr and system friction and begins to move the lock weight 2180 counterclockwise, which constitutes initiation of the time delay lock assembly 2150.

Figure 25:
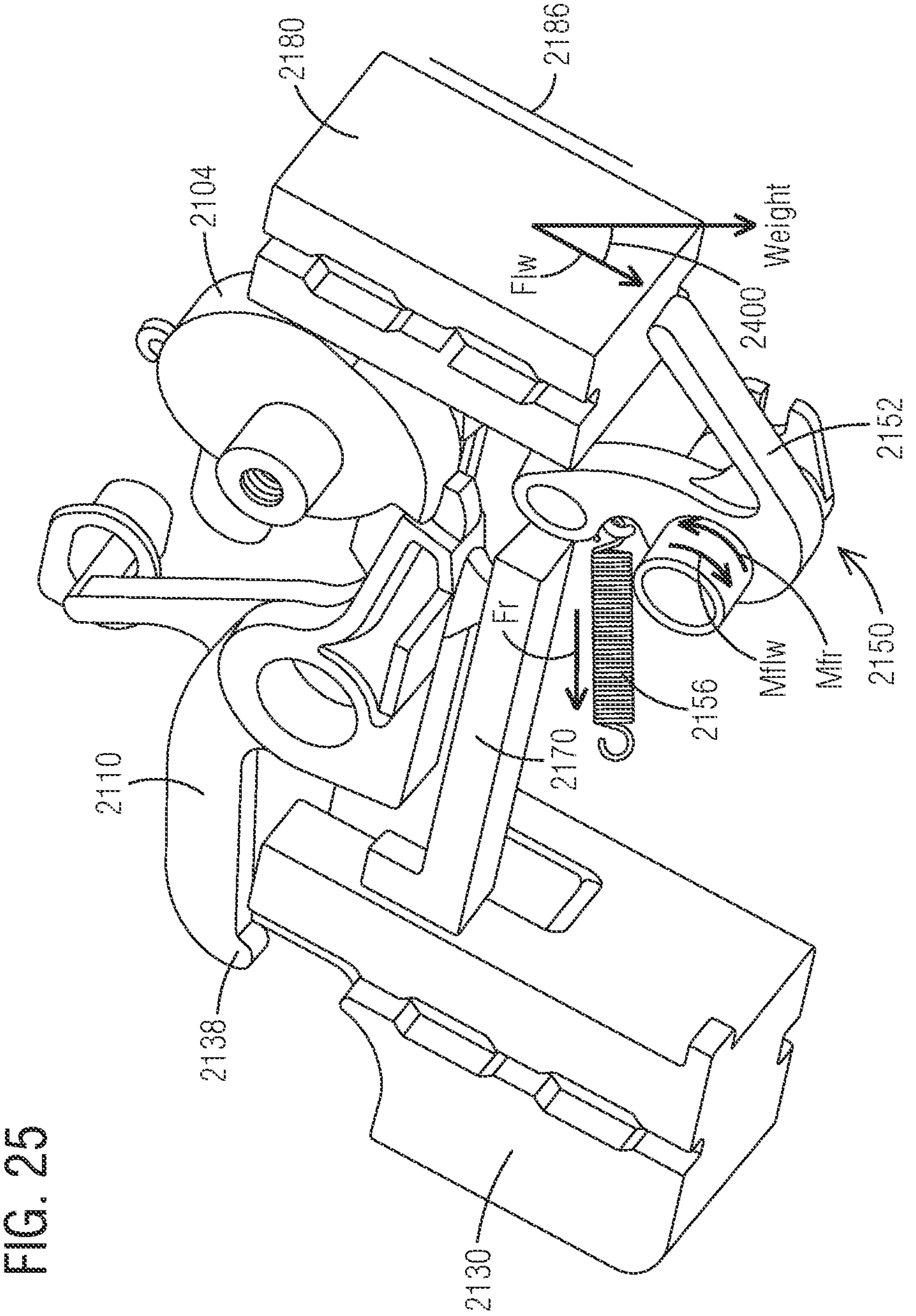
FIG. 25 shows the select parts of the latch assembly of FIG. 21 at the time delay lock threshold amount of tilt after initiation and a time delay.

FIG. 25 shows the select parts of the latch assembly 2100 of FIG. 24 at the time delay lock threshold amount of tilt 2400 after initiation and the time delay. Since the counterclockwise resilient element moment Mfr was sufficiently greater than the clockwise lock weight moment Mflw, the actuator resilient element 2114 pulled and thereby rotated the lock assembly arm 2152 counterclockwise until the brake 2170 reached the braking position shown after the time delay, which holds the actuator weight 2130 from subsequent movement. Greater tilt angles will increase the difference between the counterclockwise resilient element moment Mfr and the clockwise lock weight moment Mflw, which may reduce the time delay. However, there will always be a minimum time delay, which occurs at tilt angles greater than ninety (90) degrees when gravity pulls the lock weight 2180 off the lock assembly arm 2152. In that instance, the only resistance to the counterclockwise resilient element moment Mfr is that provided by the damper 2174.

As FIG. 24 and FIG. 25 show, the lock weight 2180 is configured to move before the actuator weight 2130 would move. This helps ensure that the time delay lock assembly 2150 locks the actuator weight 2130 at least whenever the actuator weight 2130 would move toward the unlocking position 2136. However, the lock weight 2180 may be configured to move only when the actuator weight 2130 moves, or even only when the actuator weight 2130 moves and other qualifying conditions are met.

An initial difference when in the upright orientation between the counterclockwise resilient element moment Mfr and the clockwise lock weight moment Mflw may influence the magnitude of the time delay lock threshold amount of tilt 2400. (A greater difference would require more tilt to reach the time delay lock threshold amount of tilt 2400.) The difference may be controlled by selection a strength of the actuator resilient element 2114, a lever arm distance of a connection between the actuator resilient element 2114 and the lock assembly arm 2152 from the lock assembly arm stud 2158, and selection of a lever arm distance where the lock weight force Flw is applied to the lock assembly arm 2152 from the lock assembly arm stud 2158 inter alia. The sidewall 2186 may also be angled from vertical to cause initiation sooner.

The innovative mechanism disclosed herein secures a container is a unique and innovative manner to ensure that the container remains secured until such time as a human manually releases it, or the container undergoes a rotation consistent with that experienced during a collection process. Further, the container must be reset by returning to the upright orientation before the container can be opened if other rotation occurs. These characteristics are novel and unique and therefore represent an improvement in the art.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus, comprising:

a hasp assembly comprising: a hasp configured to retain a staple therein when the hasp is in an engaged position; and an actuator that is biased toward a locking position configured to lock the hasp in the engaged position, wherein once the hasp is moved into the engaged position the actuator can reach the locking position;

an actuator weight comprising a concavity and configured to move under the influence of gravity once the apparatus is tilted from an upright orientation by more than an actuator weight threshold amount and to disengage the actuator from the hasp upon reaching an unlocking position with sufficient force; and a time delay lock assembly configured to be initiated when the apparatus is tilted from the upright orientation by a time delay lock threshold amount of tilt and configured to prevent movement of the actuator weight only after an initiation and a time delay, wherein movement of the actuator weight into the unlocking position before an end of the time delay disengages the hasp from the engaged position, and expiration of the time delay before the actuator weight reaches the unlocking position prevents the actuator weight from reaching the unlocking position and disengaging the hasp;

wherein an actuator weight range of positions includes a home position, wherein when the apparatus is in the upright orientation the home position is disposed relatively lower than the unlocking position and gravity urges the actuator weight into the home position;

wherein the actuator weight range of positions comprises an interlock position disposed between the home position and the unlocking position;

wherein the actuator weight further comprises an interlock feature that defines the concavity in the actuator weight; and wherein when the actuator weight is located anywhere from the home position to the interlock position at the end of time delay the time delay lock assembly is configured to engage the interlock feature and thereby block the actuator weight from moving past the interlock position.

2. The apparatus of claim 1, wherein the time delay lock assembly further comprises a lock weight configured to move into and out of a lock weight home position, wherein when the apparatus is in the upright orientation the lock weight is urged into the lock weight home position by gravity.

3. The apparatus of claim 2, wherein the time delay lock assembly further comprises:

a lock assembly arm configured to be moved in and out of a ready position; and a resilient element configured to urge the lock assembly arm away from the ready position with a resilient force;

wherein when the apparatus is in the upright orientation and the lock weight is in the lock weight home position, the lock weight exerts a lock weight force on the lock assembly arm that overcomes the resilient force and thereby holds the lock assembly arm in the ready position.

4. The apparatus of claim 3, wherein the apparatus is configured so that a magnitude of the lock weight force progressively decreases as the apparatus is progressively tilted from the upright orientation; and wherein upon reaching a lock weight force threshold magnitude at the time delay lock threshold amount of tilt, the resilient force overcomes the lock weigh force and begins to move the lock assembly arm from the ready position.

5. The apparatus of claim 4, wherein the time delay lock assembly further comprises:

a brake configured to move with the lock assembly arm and to configured to brake the actuator weight upon reaching a braking position; and a rotary damper configured to dampen movement of the lock assembly arm away from the lock weight home position and thereby create the time delay between the initiation and when the brake reaches the braking position.

6. The apparatus of claim 5, wherein upon returning the apparatus to the upright orientation the lock weight is configured to return to the home position; and wherein the lock weight force of the lock weight in the home position overcomes the resilient force and releases the brake from the braking position.

7. The apparatus of claim 1, wherein a brake of the time delay lock assembly is configured to move into the concavity to block the actuator weight from moving beyond the interlock position.

8. The apparatus of claim 1, wherein the interlock feature comprises a tab that protrudes from a flat side of the actuator weight and that defines the concavity.

9. An apparatus, comprising:

a hasp assembly comprising: a hasp configured to retain a staple therein when the hasp is in an engaged position; and an actuator, wherein when the hasp is in the engaged position the actuator is urged into a locking position that locks the hasp in the engaged position;

an actuator weight comprising a concavity and configured to move along an actuator weight range of positions, wherein upon reaching an unlocking position with sufficient force the actuator weight is configured to disengage the actuator from the hasp, and wherein when the apparatus is in an upright orientation the actuator weight is configured to not move toward the unlocking position; and a time delay lock assembly configured to prevent movement of the actuator weight only after initiation and a time delay, wherein the time delay lock assembly is configured to initiate at least whenever the actuator weight moves toward the unlocking position;

wherein the unlocking position defines an end of the actuator weight range of positions, and wherein the actuator weight range of positions further comprises an interlock position;

wherein the actuator weight further comprises an interlock feature that defines the concavity in the actuator weight; and wherein when the actuator weight has not reached the interlock position at the end of the time delay the time delay lock assembly is configured to engage the interlock feature and thereby block the actuator weight from moving past the interlock position and toward the unlocking position.

10. The apparatus of claim 9, further comprising a lock weight configured to move into an out of a lock weight home position, wherein when the apparatus is in the upright orientation a weight of the lock weight urges the lock weight into the lock weight home position with a lock weight force, and wherein when the lock weight is in the lock weight home position a decrease in a magnitude of the lock weight force below a lock weight force threshold magnitude initiates the time delay lock assembly.

11. The apparatus of claim 10, wherein the apparatus is configured so that the magnitude of the lock weight force progressively decreases as the apparatus is progressively tilted form the upright orientation.

12. The apparatus of claim 11, wherein the time delay lock assembly comprises:

a lock assembly arm configured to move into an out of a ready position; and a resilient element configured to urge the lock assembly arm away from the ready position with a resilient force;

wherein when the apparatus is in the upright orientation and the lock weight is in the lock weight home position the magnitude of the lock weight force overcomes the resilient force and thereby holds the lock assembly arm in the ready position.

13. The apparatus of claim 12, wherein the time delay lock assembly further comprises a damper configured to dampen movement of the lock assembly arm away from the lock weight home position.

14. The apparatus of claim 12, wherein at the lock weight force threshold magnitude the resilient force overcomes the lock weight force and initiates the time delay lock assembly by starting to move the lock assembly arm away from the ready position.

15. The apparatus of claim 14, wherein the time delay lock assembly further comprises a brake configured to move with the lock assembly arm and configured to brake the actuator weight upon reaching a braking position at the end of the time delay.

16. The apparatus of claim 9, wherein a brake of the time delay lock assembly is configured to move into the concavity to block the actuator weight from moving beyond the interlock position.

17. An apparatus, comprising:

a hasp assembly comprising: a hasp configured to retain a staple therein when the hasp is in an engaged position; and an actuator, wherein when the hasp is in the engaged position the actuator is urged into a locking position that locks the hasp in the engaged position;

an actuator weight, wherein the actuator weight comprises an interlock feature that defines a concavity, wherein the actuator weight is configured to move along an actuator weight range of positions comprising a home position, an unlocking position, and an interlock position there between, wherein upon reaching the unlocking position with sufficient force the actuator weight is configured to disengage the actuator from the hasp, and wherein when the apparatus is in an upright orientation the actuator weight is configured to not move toward the unlocking position; and a time delay lock assembly configured to initiate at least whenever the actuator weight moves toward the unlocking position;

wherein the when the actuator weight is located anywhere from the home position to the interlock position at an end of a time delay the time delay lock assembly is configured to engage the interlock feature and thereby block the actuator weight from moving past the interlock position.

* * * * *